US 6,593,950 B2

(12) United States Patent
Nomura et al.

(10) Patent No.: US 6,593,950 B2
(45) Date of Patent: Jul. 15, 2003

(54) ELECTRON-EMITTING DEVICE, AND ELECTRON BEAM-GENERATING APPARATUS AND IMAGE-FORMING APPARATUS EMPLOYING THE DEVICE

(75) Inventors: Ichiro Nomura, Atsugi (JP); Hidetoshi Suzuki, Atsugi (JP); Takashi Noma, Tsukuba (JP); Yoshikazu Banno, Ebina (JP); Rie Ueno, Hadano (JP); Naoto Nakamura, Isehara (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/418,093

(22) Filed: Apr. 6, 1995

(65) Prior Publication Data

US 2002/0041294 A1 Apr. 11, 2002

Related U.S. Application Data

(63) Continuation of application No. 07/957,529, filed on Oct. 7, 1992, now abandoned.

(30) Foreign Application Priority Data

Oct. 8, 1991 (JP) .............................................. 3-260361
Oct. 7, 1992 (JP) .............................................. 4-268714

(51) Int. Cl.⁷ .............................. B41J 2/415; H01J 1/30
(52) U.S. Cl. ....................................... 347/122; 313/310
(58) Field of Search ................................ 347/122, 129, 347/131, 115, 232, 233, 238, 240; 313/309, 336, 351, 355, 310, 346 R

(56) References Cited

U.S. PATENT DOCUMENTS 4,303,917 A * 12/1981 Kishino et al. ......... 313/496 X
4,661,743 A * 4/1987 Matsuoka et al. .......... 313/496
4,689,694 A * 8/1987 Yoshida ..................... 358/298

(List continued on next page.)

FOREIGN PATENT DOCUMENTS

| EP | 2-0262676 | 4/1988 | | |
| EP | 0 354 750 | 2/1990 | | |
| EP | 2-0354750 | 2/1990 | | |
| EP | 0388984 | 9/1990 | | |
| EP | 0 493 804 A1 | 7/1992 | | |
| EP | 0523702 A1 | 1/1993 | | |
| GB | 2183084 | 5/1987 | | |
| JP | 63-091925 | 4/1988 | | |
| JP | 1-200532 | 8/1989 | | |
| JP | 2-46636 | 2/1990 | | |
| JP | 2-56822 | 2/1990 | | |
| JP | 03-121866 | * 5/1991 | ............ | B41J/2/525 |
| JP | 3-149736 | 6/1991 | | |
| JP | 4-28139 | 1/1992 | | |

OTHER PUBLICATIONS

"Strong Electron Emission From Patterned Tin–Indium Oxide Thin Films", M. Hartwell, et al., International Electron Devices Meeting, 1975 pp. 519–521.

"Electrical Conduction And Electron Emission Of Discontinuous Thin Films", G. Dittmer, Thin Solid Films, 1972, pp. 316–329.

(List continued on next page.)

Primary Examiner—Judy Nguyen
(74) Attorney, Agent, or Firm—Fitzpatrick, Cella, Harper & Scinto

(57) ABSTRACT

An electron-emitting device having an electron-emitting region between electrodes on a substrate where the electron-emitting region contains fine particles dispersed therein at an areal occupation ratio of the fine particles ranging from 20% to 75% of the electron-emitting region is disclosed. The other electron-emitting device where the electron-emitting region contains fine particles being arranged at gaps of from 5 Å to 100 Å and having average particle diameter of from 5 Å to 1000 Å is also disclosed. Electron beam-generating apparatus and image-forming apparatus comprise one of the electron-emitting regions and a modulation means for modulating the electron beams emitted from the electron-emitting devices in accordance with information signals.

15 Claims, 26 Drawing Sheets

U.S. PATENT DOCUMENTS

| | | | | |
|---|---|---|---|---|
| 4,859,913 A | * | 8/1989 | Genovese et al. | 346/160 X |
| 4,904,895 A | | 2/1990 | Tsukamoto et al. | 313/336 |
| 4,908,539 A | * | 3/1990 | Meyer | 315/169.3 |
| 5,015,912 A | * | 5/1991 | Spindt et al. | 313/495 |
| 5,023,110 A | | 6/1991 | Nomura et al. | 427/49 |
| 5,066,883 A | * | 11/1991 | Yoshioka et al. | 313/309 |
| 5,105,281 A | * | 4/1992 | Kusaka | 346/107 R |
| 5,530,314 A | | 6/1996 | Banno et al. | |
| 5,578,897 A | | 11/1996 | Nomura et al. | 313/310 |
| 5,828,352 A | | 10/1998 | Nomura et al. | 345/74 |
| 6,011,567 A | | 1/2000 | Nakamura et al. | 347/115 |
| 6,366,265 B1 | | 4/2002 | Nomura et al. | 345/74.1 |

OTHER PUBLICATIONS

"The Emissions Of Hot Electrons And The Field Emission Of Electrons From Tin Oxide", M.I. Elinson, et al., Radio Engineering and Electronic Physics, 1965, pp. 1290–1296.

M. Bischoff, "Carbon–Nanoslit Model for the Electroforming Process in M–I–M Structures", Int. J. Electronics, 1991, vol. 70, No. 3, pp. 491–498.

H. Pagnia et al., "Scanning Tunnelling Microscopic Investigations of Electroformed Planar Metal–Insulator–Metal Diodes", Int.. J. Electronics, 1990, vol. 69, No. 1, pp. 25–32.

* cited by examiner

ELECTRON-EMITTING DEVICE, AND ELECTRON BEAM-GENERATING APPARATUS AND IMAGE-FORMING APPARATUS EMPLOYING THE DEVICE

This application is a continuation of application Ser. No. 07/957,529 filed Oct. 7, 1992, now abandoned.

BACKGROUND OF THE INVENTION

1. Field of the Invention

The present invention relates to a cold-cathode type of electron-emitting device. The present invention also relates to an electron beam-generating apparatus, and an image-forming apparatus employing the electron-emitting device.

2. Related Background Art

Cold cathode devices are known as devices capable of emitting electrons with a simple structure. For example, a cold cathode device is reported by M. I. Elinson (Radio Eng. Electron Phys., vol. 10, pp. 1290–1296 (1965)). These devices are based on the phenomenon that electrons are emitted by flowing electric current in parallel through a thin film of small area formed on a substrate. Such devices are called generally surface-conduction type electron-emitting devices. The surface-conduction type electron-emitting devices include the ones using a thin $SnO_2(Sb)$ film developed by M. I. Elinson as mentioned above; the ones using a thin Au film (G. Dittmer: "Thin Solid Films", vol. 9, p. 317, (1972)); and the ones using a thin ITO film (M. Hartwell and C. G. Fonstad: IEEE Trans. ED Conf., p. 519 (1975)).

A typical construction of the surface conduction type electron-emitting device is shown in FIG. 30. This device comprises electrodes 82, 83 for electric connection, a thin film 85 formed from an electron-emitting material, a substrate (insulating base) 81, and an electron-emitting portion 84. Conventionally, in such a surface conduction type electron-emitting device, the electron-emitting portion is formed by electric current-heating treatment called "forming". In this treatment, electric voltage is applied between the electrode 82 and the electrode 83 to flow electric current through the thin film 85 and to destroy, deform, or denature locally the thin film 85 by utilizing Joule heat generated. Thereby, the electron-emitting portion 84 which has high electric resistance is formed, thus the function of electron emission being obtained. Here the state of the high electric resistance results from discontinuity of the thin film 85 in which cracks of 0.5 to 5 μm long are formed locally and the cracks have an island structure therein. The island structure means a state of the film that the film contains fine particles of several tens of angstroms to several microns in diameter and the particles are discontinuous but the film is electrically continuous. In conventional surface conduction type electron-emitting device, voltage is applied to the aforementioned discontinuous high-resistance film through the electrodes 82, 83 to flow current at the surface of the device, thereby electron are emitted from the fine particles.

A novel surface conduction type electron-emitting device in which electron-emitting fine particles are distributed between electrode was disclosed by the inventors of the present invention in Japanese Patent Application Laid-Open Nos. Hei-1-200532 and Hei-2-56822. This electron-emitting device has advantages that (1) high electron-emitting efficiency can be obtained, (2) the device can be readily prepared because of its simple construction, (3) many devices can be arranged on one and the same substrate, and so forth. FIG. 31 shows a typical construction of such a surface conduction type electron-emitting device, which comprises electrodes 82, 83 for electric connection, an electron-emitting portion 86 having electron-emitting fine particles dispersed therein, and a substrate 81.

In recent years, attempts are made to use the aforementioned surface conduction type electron-emitting device for an image-forming apparatus. One example is shown in FIG. 32, which illustrates an image-forming apparatus having a number of the aforementioned electron-emitting devices arranged therein. The apparatus comprises wiring electrodes 92, 93, electron-emitting portions 94, grid electrodes 95, electron-passing holes 96, and an image-forming member 97. This image-forming member is made of a material such as fluorescent materials and resist materials which causes light-emission, color change, electrification, denaturing or like change on collision of electrons. With this image-forming apparatus, the linear electron sources having a plurality of electron-emitting portions 94 arranged between the electrodes 92, 93, and grid electrodes 95 are driven in XY matrix, and electrons are made to collide against the image-forming member 97 in correspondence with information signals to form an image.

The electric characteristics (current-voltage characteristics) of conventional surface conduction type of electron-emitting devices are explained by reference to FIG. 6. In conventional electron-emitting devices, electron emission increases rapidly from a certain device voltage Ve (voltage applied to the device) with increase of the device voltage, and at a device voltage Vd, a sufficient electron beam is emitted: for example, a sufficient electron beam for forming an image in the above-mentioned image-forming apparatus. The device current If (current which flows in the device) increases with the device voltage, and the rate of the increase becomes larger at around the device voltage Ve. In such conventional devices generally, strong ineffective current, which is useless for electron emission, flows as shown in FIG. 6. The ratio of the ineffective current to the device current If rises in some cases to as much as about 50%. Such increase of the ineffective current will cause increase of power consumption in driving the electron-emitting device, and increase of heat generation in the electron-emitting device to deteriorate electron-emitting characteristics (electron-emission efficiency, electron-emission stability, etc. Further the increase of the ineffective current gives rise to the problems, when the electron-emitting device in which the ineffective current is great is used for an image-forming apparatus: 1) the ineffective current flows to wiring electrodes to cause voltage drop, whereby the quantity of electron emission varies with the electron-emitting devices, and 2) the ineffective current varies depending on the kind of the image (namely, difference in inputted information signal) to cause voltage drop in wiring electrode, whereby quantity of the emitted electrons varies. Such disadvantageous phenomena further cause lowering of contrast and sharpness of the formed image; and in particular, in the case where the formed image is a fluorescent image, bring about variation and change of luminance of the fluorescent images, which makes it difficult to obtain image finess and to enlarge a picture screen, and further increase the power consumption.

SUMMARY OF THE INVENTION

An object of the present invention is to provide an electron-emitting device and an electron beam-generating apparatus in which ineffective current is extremely weak.

Another object of the present invention is to provide an electron-emitting device and an electron beam-generating apparatus which are excellent in electron emission characteristics such as electron-emission efficiency, and electron-emission stability, and which consumes less electric power.

A further object of the present invention is to provide an electron beam-generating apparatus in which ineffective current is extremely weak in a whole apparatus, and which gives an image with high contrast and high sharpness with less power consumption, in particular an electron beam-generating apparatus capable of forming a luminescent image with extremely low variation and low fluctuation of luminance.

According to an aspect of the present invention, there is provided an electron-emitting device having an electron-emitting region between electrodes on a substrate, the electron-emitting region containing fine particles dispersed therein at an areal occupation ratio of the fine particles ranging from 20% to 75% of the electron emitting region.

According to another aspect of the present invention, there is provided an electron-emitting device having an electron-emitting region between electrodes on a substrate, the electron-emitting region containing the fine particles dispersed therein at gaps of from 5 Å to 100 Å and having average particle diameter of from 5 Å to 1000 Å.

According to still another aspect of the present invention, there is provided an electron-emitting device having an electron-emitting region between electrodes on a substrate, the electron-emitting region containing fine particles dispersed therein at an areal occupation ratio of the fine particles ranging from 20% to 75% of the electron-emitting region, and the fine particles being dispersed at gaps of from 5 Å to 100 Å and having average particle diameter of from 5 Å to 1000 Å.

According to a further aspect of the present invention, there is provided an electron-emitting device having an electron-emitting region between electrodes on a substrate, the voltage application length in the electron-emitting region ranging from 5 Å to 300 Å.

According to a still further aspect of the present invention, there is provided an electron-emitting device having an electron-emitting region between electrodes on a substrate, the electric field strength in the electron-emitting region being not less than $10^7$ V/cm.

According to a further aspect of the present invention, there is provided an electron-beam generating apparatus, comprising a plurality of the above-specified electron-emitting devices and a modulation means for modulating the electron beams emitted from the electron-emitting devices in accordance with information signals.

According to a still further aspect of the present invention, there is provided an image-forming apparatus, comprising a plurality of the above-specified electron-emitting devices, a modulation means for modulating the electron beams emitted from the electron-emitting devices in accordance with information signals, and an image-forming member for forming image on irradiation of electron beams.

According to a further aspect of the present invention, there is provided an image-forming apparatus, comprising a plurality of the above-specified electron-emitting devices, a modulation means for modulating the electron beams emitted from the electron-emitting devices in accordance with information signals, and a light-emitting member for emitting light on irradiation of electron beams.

According to a still further aspect of the present invention, there is provided an image-forming apparatus, comprising a plurality of the above-specified electron-emitting devices, a modulation means for modulating the electron beams emitted from the electron-emitting devices in accordance with information signals, a light-emitting member for emitting light on irradiation of electron beams, and a recording member for recording an image on irradiation of light from the light-emitting member.

According to a further aspect of the present invention, there is provided an image-forming apparatus, comprising a plurality of the above-specified electron-emitting devices, a modulation means for modulating the electron beams emitted from the electron-emitting devices in accordance with information signals, a light-emitting member for emitting light by irradiation of electron beams, and a supporting means for a recording member for recording an image by irradiation of light from the light-emitting member.

DESCRIPTION OF THE PREFERRED EMBODIMENT

Figure 1:
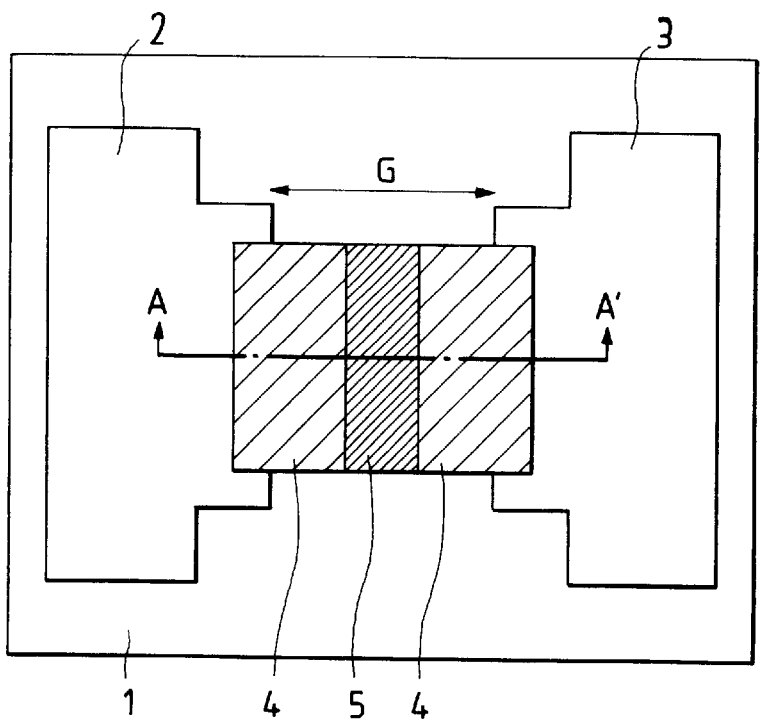
FIG. 1 is a plan view illustrating schematically an electron-emitting device of the present invention.
Figure 2:
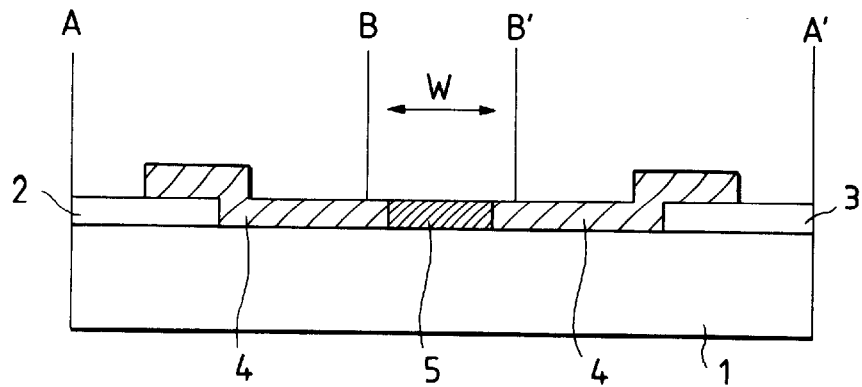
FIG. 2 is a sectional view of the electron-emitting device at A-A' in FIG. 1.
Figure 3:
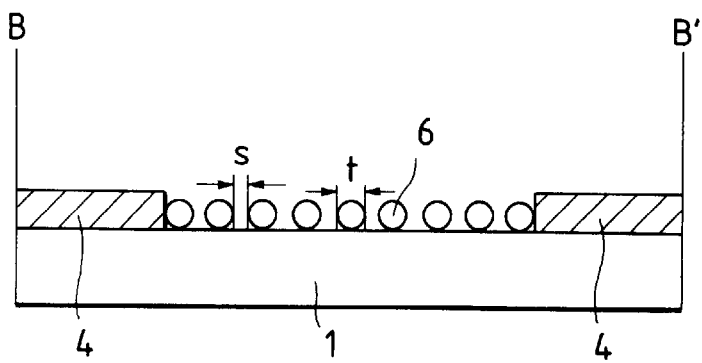
FIG. 3 is a sectional view of the electron-emitting device at B-B' in FIG. 2.

The electron-emitting device of the present invention is described below in detail. First, the characteristic portion of the electron-emitting device is explained by reference to FIG. 1 (plan view), FIG. 2 (sectional view at A–A' in FIG. 1), and FIG. 3 (sectional view at B-B' in FIG. 2). In FIGS. 1 to 3, the numeral 1 denotes an insulating substrate; 2 and 3, each an electrode; 5, an electron-emitting region; 4, a fine particle film having an electric resistance lower than that of the electron-emitting region 5; and 6, a fine particle dispersed in the electron-emitting region 5. The electron-emitting device of the present invention is required essentially to have an electron-emitting region 5 having fine particles 6 dispersed therein, and electrodes 2 and 3 to apply voltage to the interior of the region 5. The electron-emitting device of the present invention serves in such a mechanism that electrons pass (or current flows) through the electron-emitting region by application of voltage between the electrodes 2 and 3, and the electrons are emitted out from the gap formed by the fine particles 6 (or spacing between the fine particles) in the region. The fine particle film 4 having lower resistance is not an essential requirement in the present invention, but is preferred to improve further the electrical contact between the electron-emitting region 5 and the electrodes 2 and 3. The electron-emitting region and the fine particles constituting the fine particle film 4 are both made of an electroconductive material.

In addition to the above essential requirement, the electron-emitting device of the present invention has to satisfy further another requirement shown below, and is classified into two types of embodiments according to the requirement. It is described in detail.

Figure 4A:
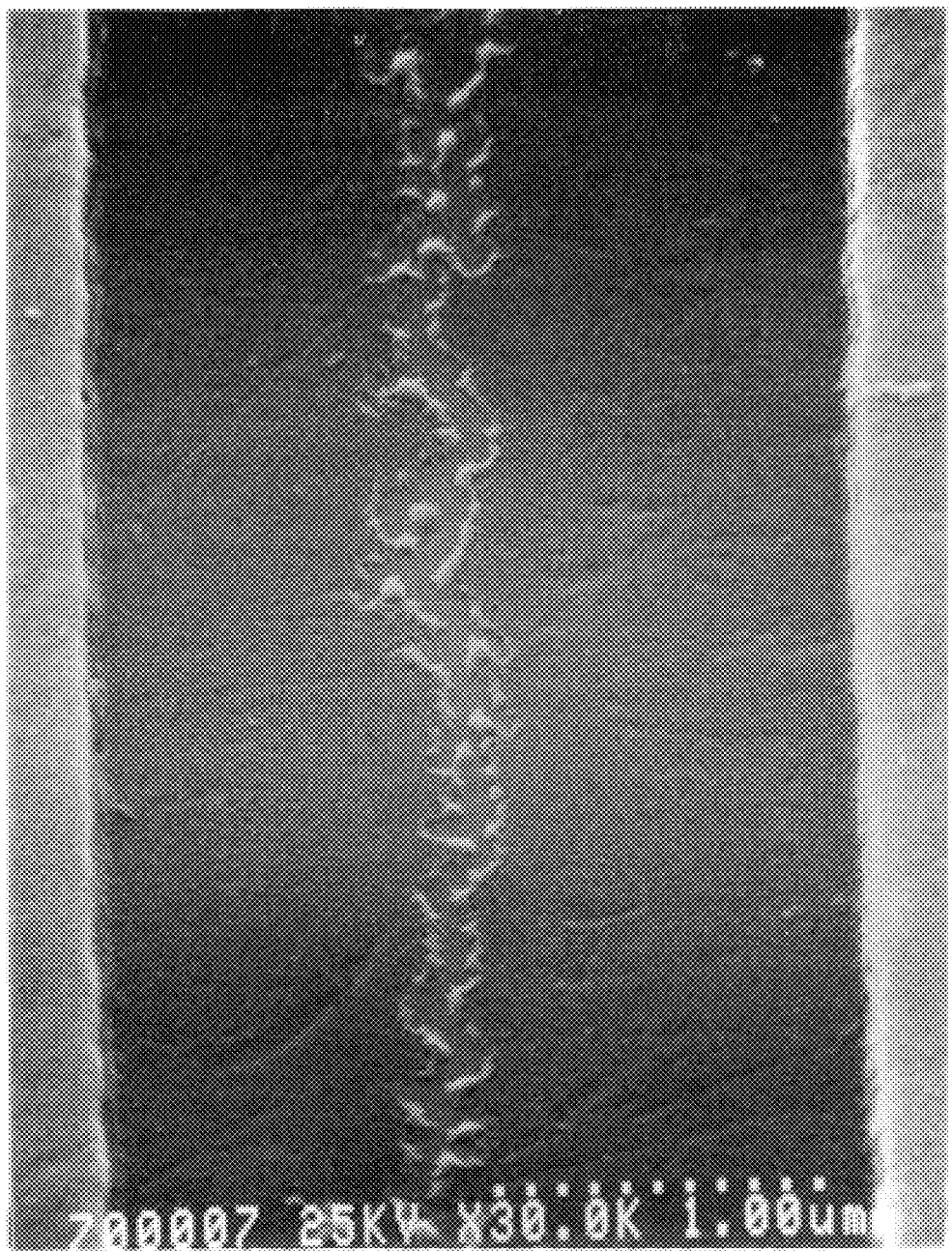
FIG. 4A is an SEM photograph of an electron-emitting region between electrodes of an electron-emitting device of the present invention (magnification: ×30,000).
Figure 4B:
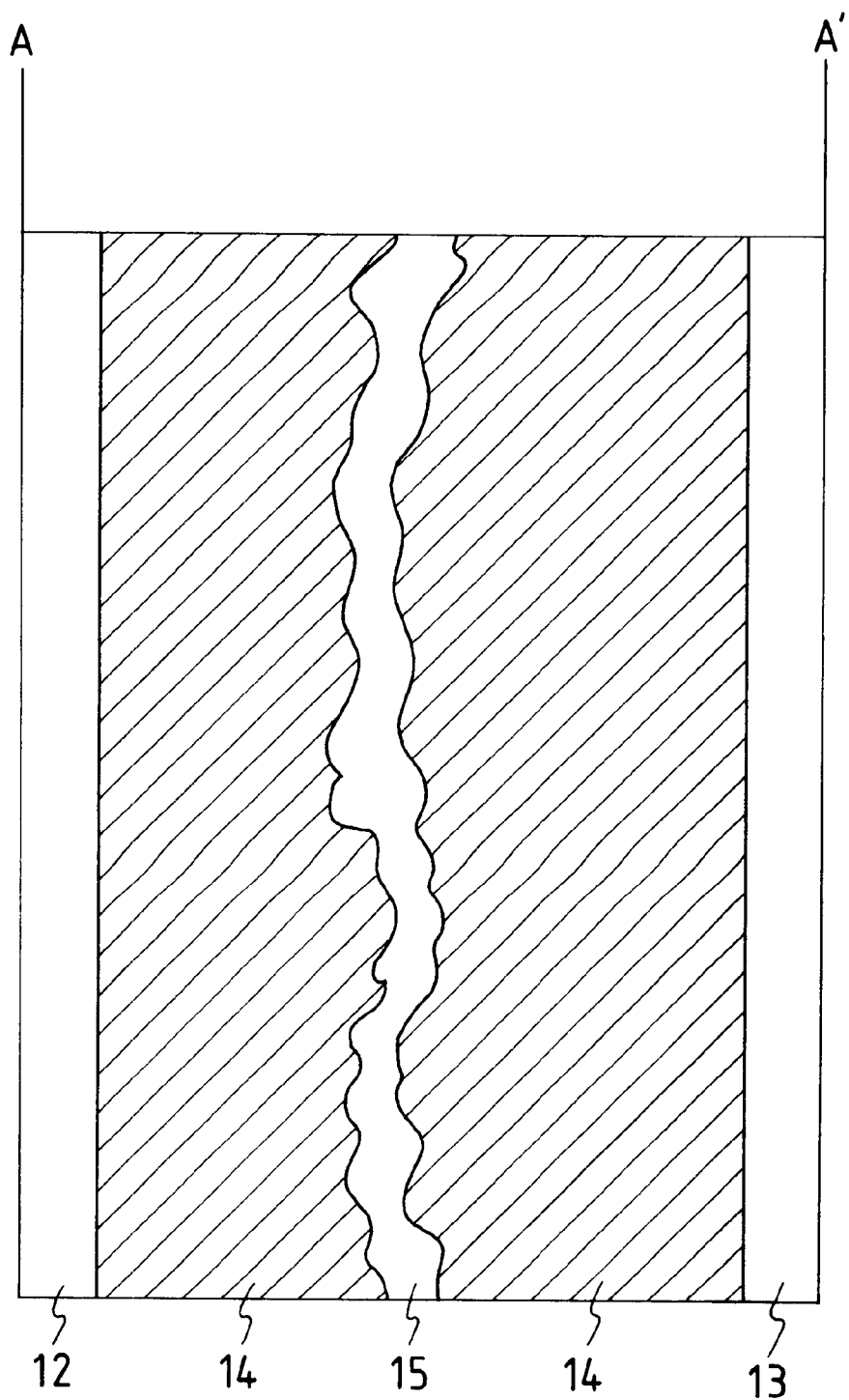
FIG. 4B is a sketch of an SEM photograph of an electron-emitting region of FIG. 4A (plan view).
Figure 5A:
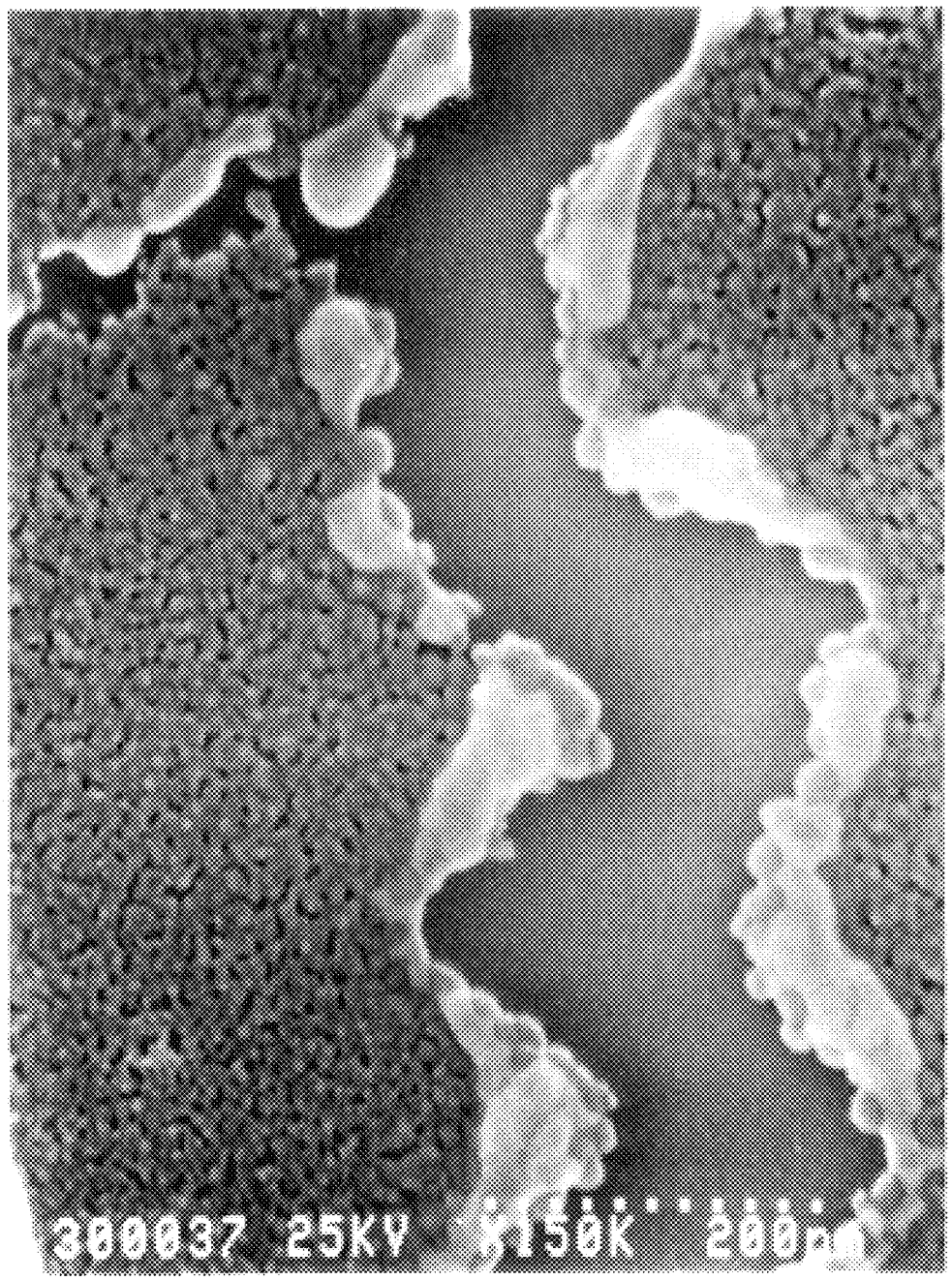
FIG. 5A is an enlarged SEM photograph of an electron-emitting region of the electron-emitting device of FIG. 4 (magnification: ×150,000).
Figure 5B:
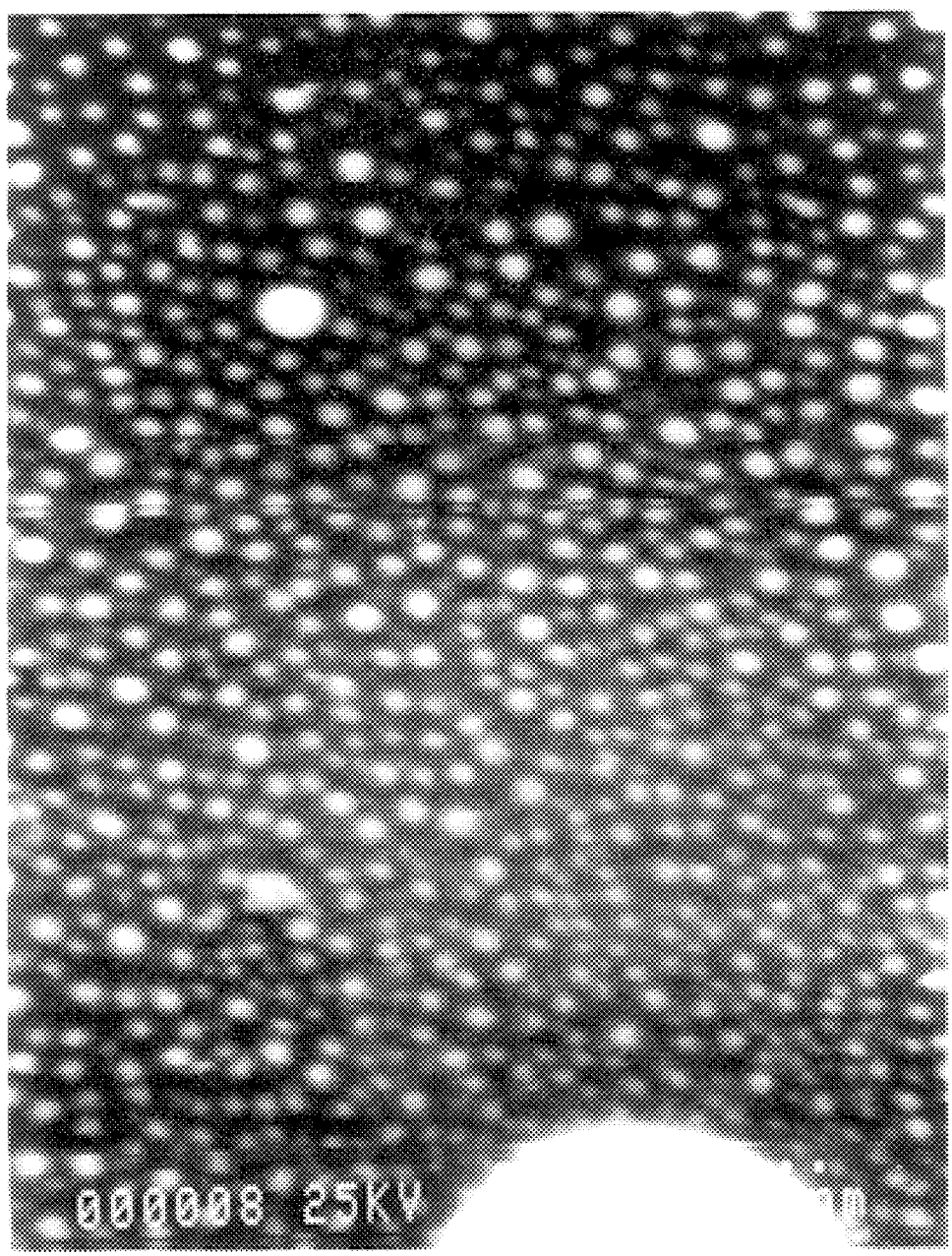
FIG. 5B is an enlarged SEM photograph of an electron-emitting region of the electron-emitting device of FIG. 4 (magnification: ×800,000).
Figure 5C:
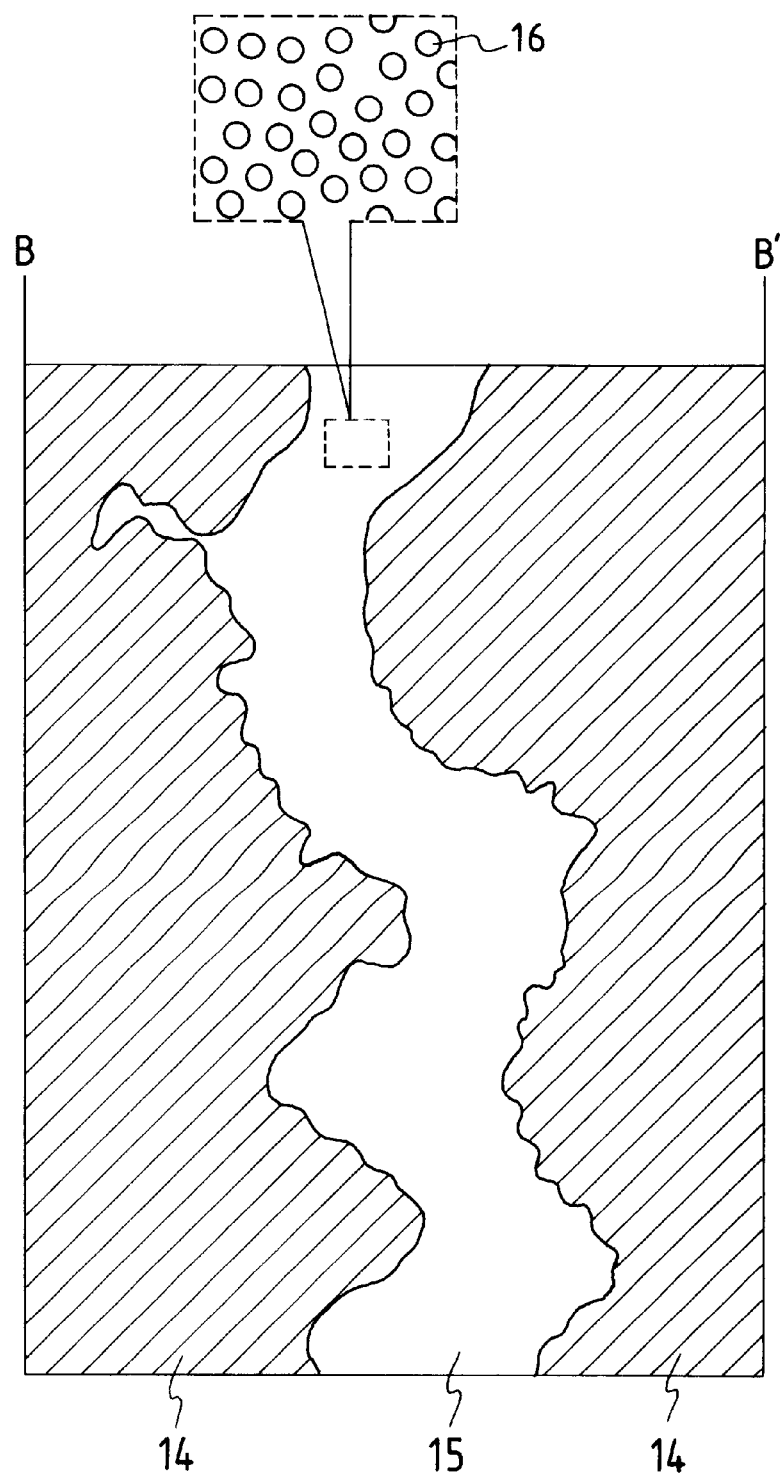
FIG. 5C is a sketch of the enlarged SEM photograph of an electron-emitting region of FIG. 5A (plan view).

In the one type of embodiment of the electron-emitting device, the areal occupation ratio of the fine particles is in the range of from 20 to 75% in the electron-emitting region 5. FIG. 4A, FIG. 5A, and FIG. 5B are SEM (scanning electron microscope) photographs of an electron-emitting region of an electron-emitting device of the present invention prepared as examples described later. FIG. 4B and FIG. 5C are sketches of the SEM photographs. FIG. 4A and FIG. 4B shows a view of the region A–A' of FIG. 2 observed from the top. FIG. 5A and FIG. 5C shows a view of the region A–A' of FIG. 2 observed from the top. FIG. 5B and the dotted-line region in FIG. 5C correspond to the enlarged view of the electron-emitting region 15 observed with SEM of high magnification. The numerals 12 and 13 denote electrodes; 14, a fine particle film; 15, an electron-emitting region; and 16 a fine particle dispersed in the electron-emitting region 15. The areal occupation ratio in the present invention means the value measured as follows. As shown by the dotted-line area in FIG. 5C, the SEM image of the inside of the electron-emitting region 15 of the element is taken at a magnification such that 10 to 1000 fine particles are observed (FIG. 5B). (An STM image (scanning tunnel microscopy image) may be used instead of the SEM image.) With the SEM image, the ratio of the total area of the fine particles to the whole dotted-line area is measured. This measurement is practiced throughout the entire area of the electron-emitting region 15. The average of the measured values is the areal occupation ratio of the fine particles In the electron-emitting device of the present invention, the relations of the areal occupation ratio of the fine particles with the aforementioned ineffective current flowing in the device, and with the electron-emitting characteristics of the device are considered as below by the inventors of the present invention. If the areal occupation ratio of the fine particles is excessively large, the ratio of the aforementioned gap to the entire electron-emitting region is extremely small, and the electron-emitting region behaves as a continuous film. Therefore, the quantity of electrons flowing through the continuous film is larger than the quantity of electrons emitted from the gap. As a result, the the ineffective current becomes stronger, and quantity of the emitted electrons decreases. On the other hand, if the areal occupation ratio is extremely small, the ratio of the aforementioned gap to the entire electron-emitting region is excessively large, and the higher voltage is required for electron emission. Therefore, a phenomenon occurs that electrons once emitted are pulled back to the electrode. As the results, the ineffective current becomes stronger, and the quantity of the emitted electrons decreases also in this case.

After comprehensive study on the basis of the above considerations, it was found by the inventors of the present invention that, if the areal occupation ratio of the fine particles is in the range of from 20 to 75%, more preferably from 35 to 60%, the ineffective current of the electron-emitting device is effectively made extremely small, and the quantity of electron emission is increased, and further thereby the electron-emission efficiency and the electron-emission stability are improved effectively. Consequently, the present invention has been completed.

In this first embodiment of the present invention, the average particle diameter of the fine particles dispersed in the electron-emitting region is adjusted preferably to be in the range of from 5 to 300 Å, more preferably 5 to 80 Å. With the average diameter within this range, the ineffective current flowing through very large particles can be suppressed, the ineffective current in the whole device can further be reduced, and the electron emission efficiency and the electron emission stability (in particular, flickering of electron emission) are improved more.

In the other type of embodiment of the electron-emitting device of the present invention, the gap between the fine particles 6 in the electron-emitting region 5 is in the range of from 5 to 100 Å, and the average particle diameter of the fine particles is in the range of from 5 to 1000 Å. The gap between the fine particles in the present invention means the spacing of particles as shown by the symbol S in FIG. 3. The gap S of the fine particles and the average particle diameter t are measured as follows. As shown by the dotted-line area in FIG. 5, the SEM image of the inside of the electron-emitting region 15 (photograph) of the element is taken at a magnification such that 10 to 1000 fine particles are observed. (An STM image (scanning tunnel microscopy image) may be used instead of the SEM image.) With the SEM image, the gaps S and the diameters t of all the fine particles are measured. This measurement is practiced throughout the entire of the electron-emitting region 15. The respective average of the measured values are the gap and the average particle diameter of the fine particles.

In the electron-emitting device of the present invention, the dependence of the ineffective current flowing in the device and the electron emission characteristics of the device on the fine particle gap and the average diameter are considered as below by the inventors of the present invention. If the average particle diameter is excessively large and the fine particle gap is extremely small, the ratio of the aforementioned gap to the entire electron-emitting region is too small, and the the electron-emitting region behaves as a continuous film. Therefore, the quantity of electrons flowing through the continuous film is larger than the quantity of electrons emitted from the gap. As a result, the the ineffective current becomes large, and quantity of the emitted electrons decreases. On the other hand, if the the average particle diameter is extremely small and the gap of the fine particles is extremely large, the ratio of the aforementioned gap to the entire electron-emitting region is too large, and a higher voltage is required for electron emission. Therefore, a phenomenon occurs that electrons once emitted are pulled back to the electrode. As a result, the ineffective current becomes large, and the quantity of the emitted electrons decreases also in this case.

On the basis of the above considerations, comprehensive studies were made by the inventors of the present invention, and it was found that, if the gap of the fine particles is adjusted to be within the range of from 5 to 100 Å, preferably 5 to 50 Å, the ineffective current of the electron-emitting device is effectively made extremely small, and the quantity of electron emission is increased, and further thereby the electron emission efficiency and the electron emission stability are improved effectively. Consequently, the present invention has been completed. In this second embodiment of the present invention, the average particle diameter of the fine particles dispersed in the electron-emitting region is adjusted preferably to be in the range of from 5 to 300 Å, more preferably 5 to 80 Å from the same reason as in the above-described first embodiment.

Two types of embodiments of the electron-emitting device of the present invention are described above. The electron-emitting device which meets simultaneously the both requirements of the two types of embodiments is more preferable in the present invention. That is, if the the areal occupation ratio in the electron-emitting region is from 20 to 75%, the gap of the particles is from 5 to 100 Å, and the average particle diameter of the fine particles is from 5 to 1000 Å, then the electron-emitting device is improved in comparison with each of the above embodiments in reducing the ineffective current in the device and is superior in electron emission quantity, electron emission efficiency, and electron emission stability (prevention of flickering of electron emission), and further the device is driven with lower voltage and has longer life. The above effects are more remarkable if the areal occupation ratio is from 35 to 60%, and the particle gap is from 5 to 50 Å. The effects are still more remarkable if the average particle diameter is from 5 to 300 Å, more preferably 5 to 80 Å.

The methods for controlling the areal occupation ratio, the fine particle gap, and the fine particle diameter are described below. The control of these parameters were practiced as follows. The gap between the electrodes was set in the range of from 0.2 to 5 $\mu$m. An electroconductive film having sheet resistance of from $3 \times 10^3$ $\Omega/cm^2$ to $10^7$ $\Omega/cm^2$ was formed by placing electroconductive particles of from 5 to 100 Å in particle diameter in dispersion between the electrodes. To the electroconductive film, a specified wave form of voltage pulse was applied through the electrodes. The applied voltage pulse is suitably decided depending on the shape of the electrodes, the material of the electroconductive film, and the material of the substrate. The material of the electroconductive particles includes metals such as Pd, Nb, Mo, Rh, Hf, Ta, W, Re, Ir, Pt, Ti, Au, Ag, Cu, Cr, Al, Co, Ni, Fe, Pb, Cs, and Ba; borides such as $LaB_6$, $CeB_6$, $HfB_4$, and $GdB_4$; carbides such as TiC, ZrC, HfC, TaC, SiC, and WC; nitrides such as TiN, ZrN, and HfN; metal oxides such as PdO, $Ir_2O_3$, $SnO_2$, and $Sb_2O$; semiconductors such as Si, and Ge; carbon, Ag, Mg, and the like. The above method is preferred in controlling the parameters.

The large ineffective current of conventional electron-emitting device as described above, was further studied by the inventors of the present invention. As a result, it was found that the strength of the ineffective current flowing through the electron-emitting device varies depending on the size of the region where the voltage for driving the device is effectively applied (the size being referred to as "voltage application length"). It was further found that the ineffective current can be suppressed to be extremely small by adjusting the voltage application length within a certain range, the ineffective current of the device being negligible at the voltage application length of from 5 to 300 Å, preferably 5 to 50 Å. The voltage application length, in more detail, means a length of the region where the voltage is effectively applied as described above in the electron-emitting device. In this region, voltage drops substantially but outside the region, the voltage does not drop substantially.

Figure 8A:
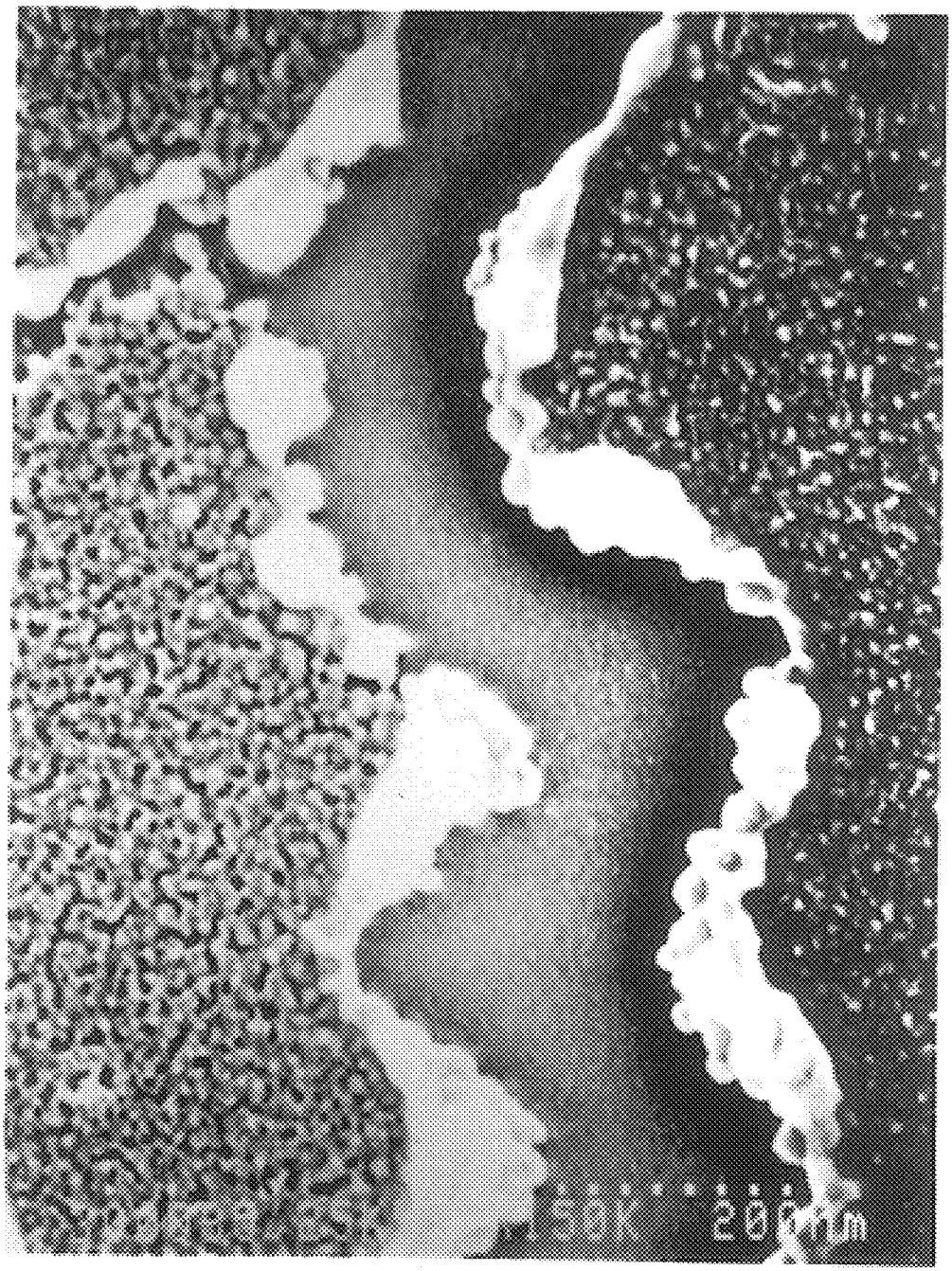
FIG. 8A is an SEM photograph (magnification: ×150,000) to explain the method for measuring the voltage application length of the electron-emitting device of the present invention.
Figure 8B:
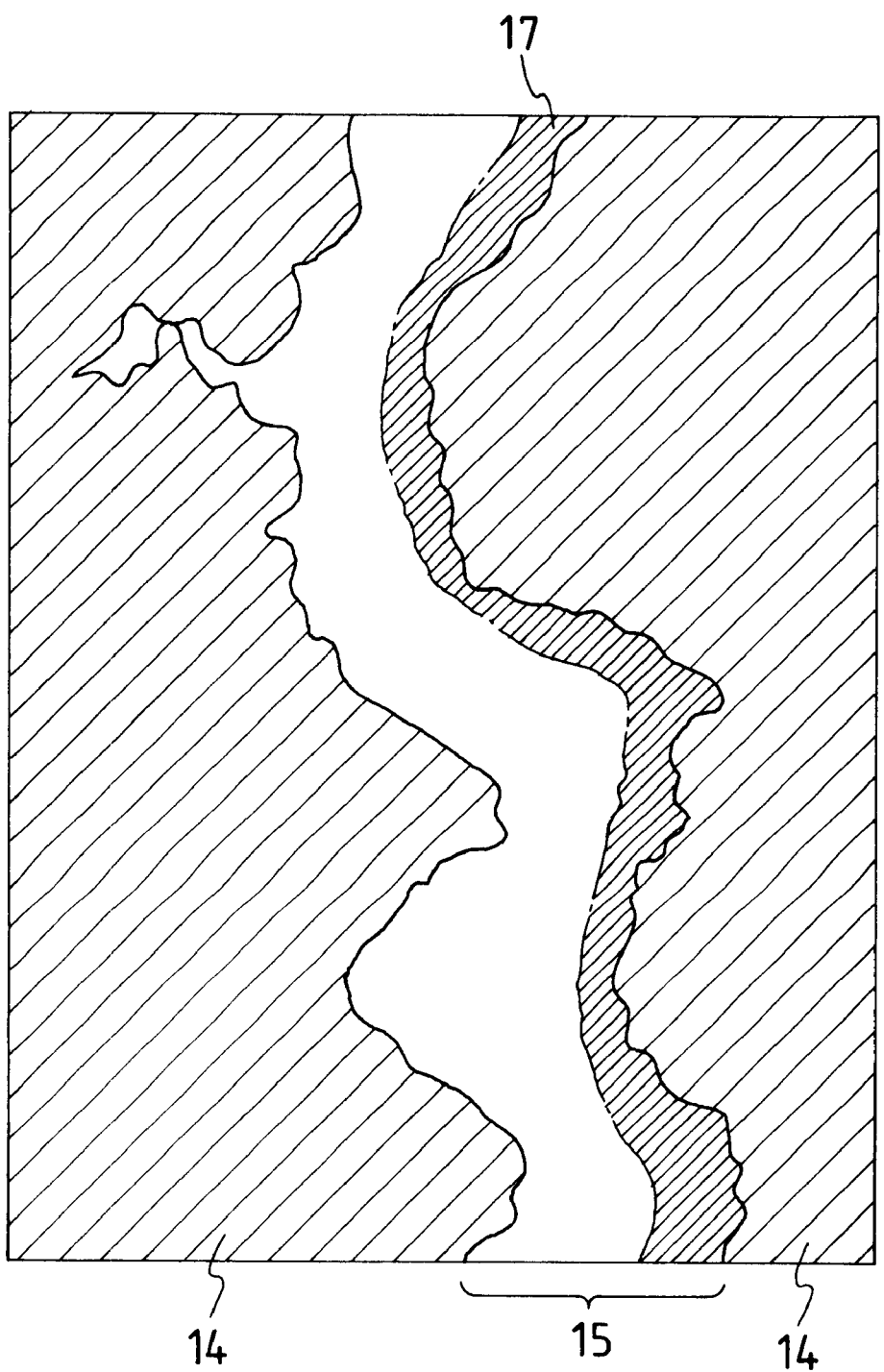
FIG. 8B is a sketch of the SEM photograph of FIG. 8A.
Figure 9A:
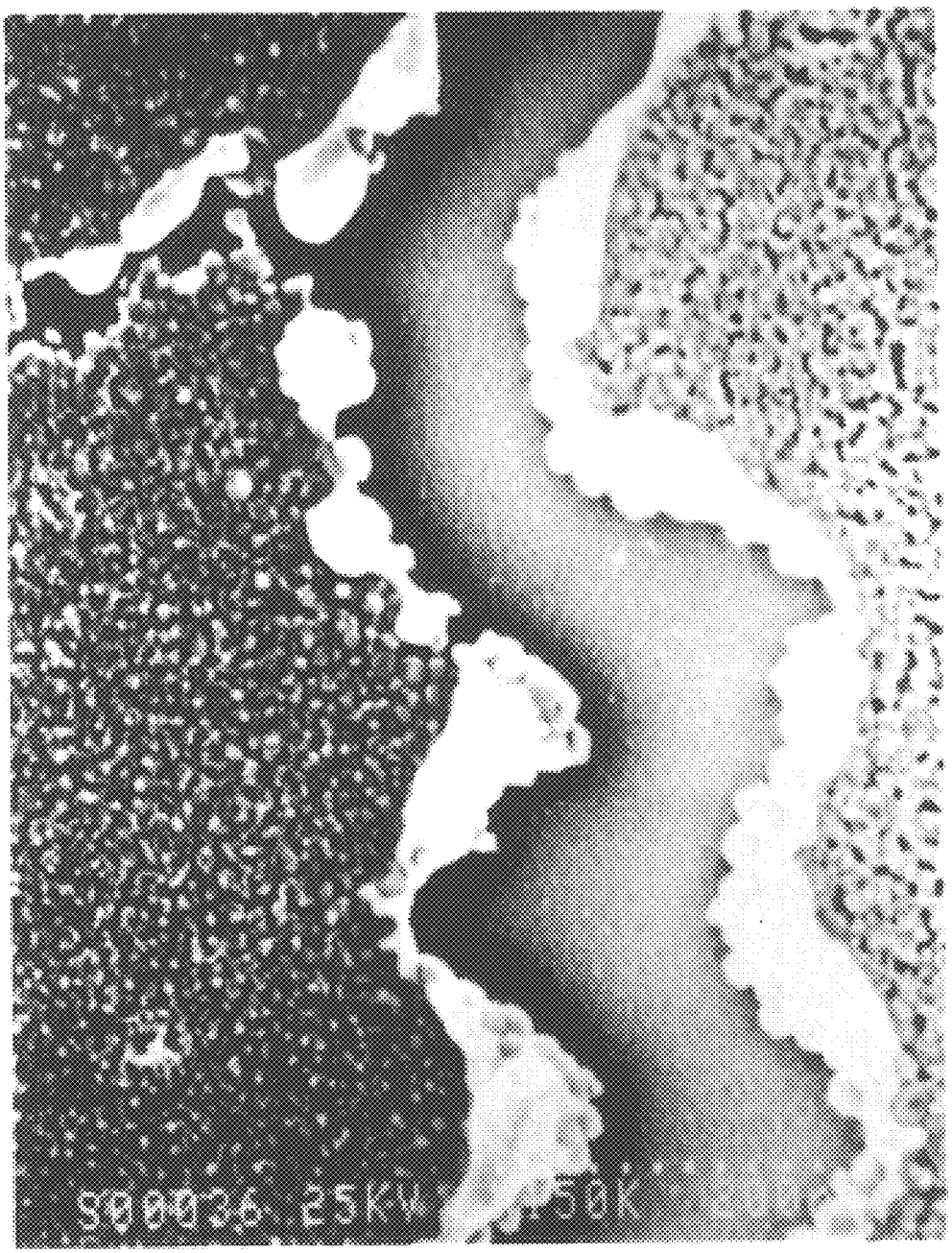
FIG. 9A is another SEM photograph (magnification:×150,000) to explain the method for measuring the voltage application length of the electron-emitting device of the present invention.
Figure 9B:
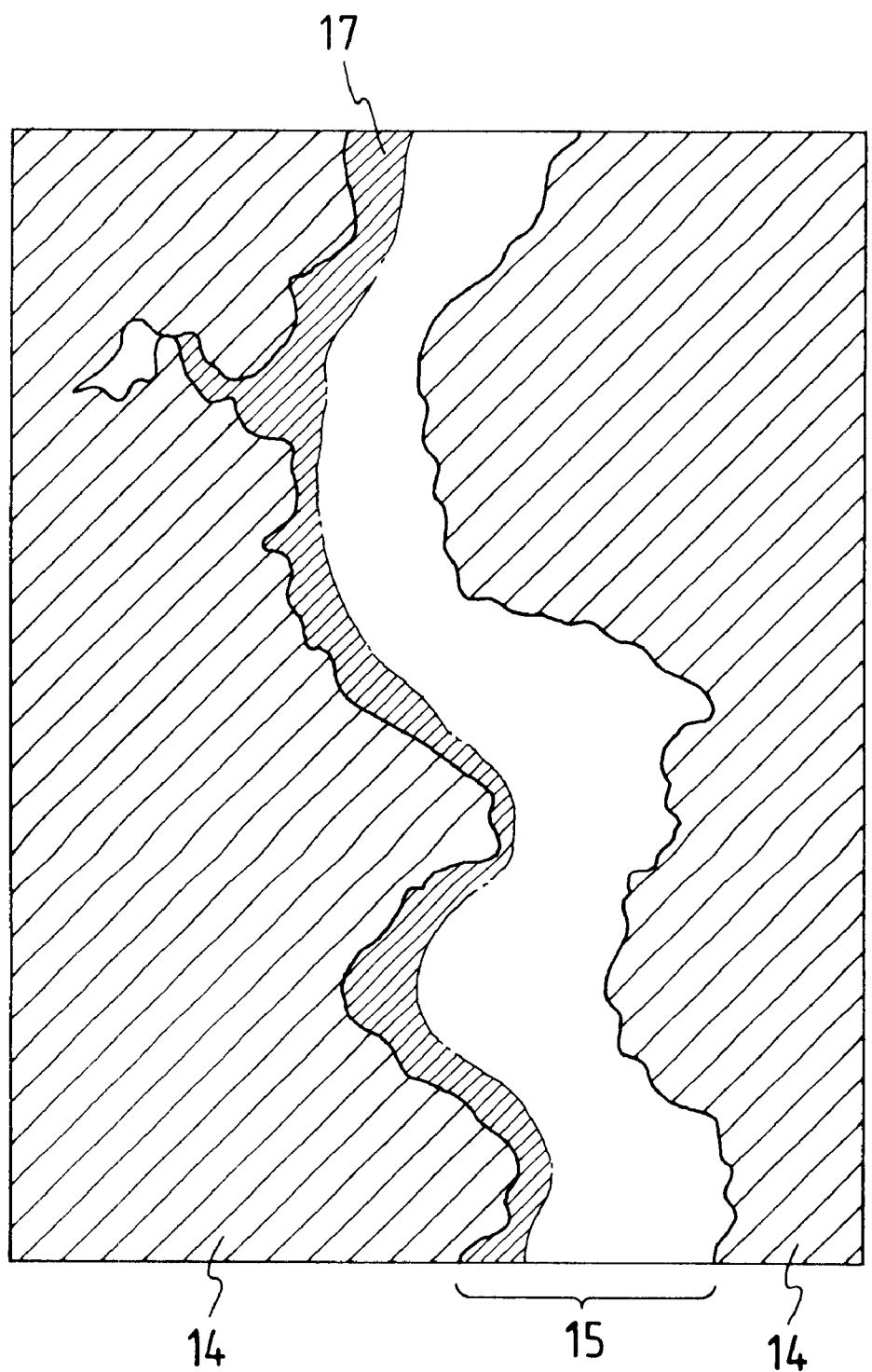
FIG. 9B is a sketch of the SEM photograph of FIG. 9A.
Figure 10:
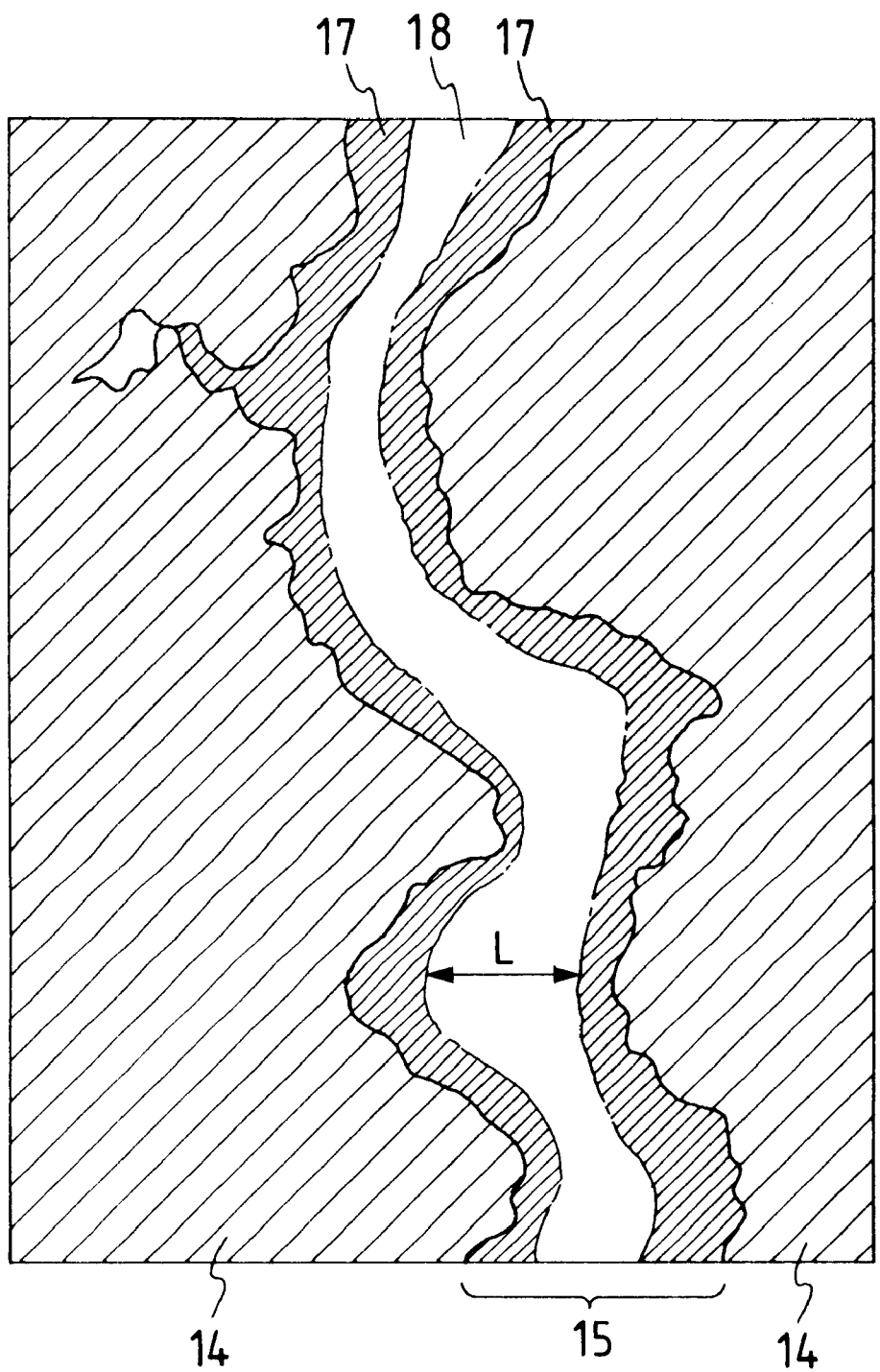
FIG. 10 is a drawing to explain the method for measuring the voltage application length of the electron-emitting device of the present invention.

The voltage application length is measured as below. FIG. 8A is an SEM photograph of an area between the electrodes on application of voltage to an electron-emitting device of the present invention. FIG. 8B is a sketch of the SEM photograph of FIG. 8A. FIG. 9A is an SEM photograph of an area between the electrodes of the same electron-emitting device on application of voltage in the reversed direction. FIG. 9B is a sketch of the SEM photograph of FIG. 9A. In FIG. 8B and FIG. 9B, the numeral 15 denotes an electron-emitting region; the numeral 14 denotes an electroconductive film for sufficient electric contact of electrodes (not shown in the drawing) with the electron-emitting region, and the numeral 17 denotes a portion from which the secondary electron emission is less. This portion is observed to be dark in the actual SEM image (FIG. 8A and FIG. 9B). The SEM photograph of the area between the device electrodes to be measured is taken by applying to the electrodes a voltage of from 1.5 V to 4.0 V under a vacuum of from $1\times10^{-3}$ to $1\times10^{-6}$ torr. Then, the same SEM photograph is taken by applying the same voltage in the reversed direction at the same magnification. The obtained two SEM images are superposed as shown in FIG. 10. The maximum width L of the blank area 18 in the electron-emitting region 15 is measured, from which the real length is calculated in consideration of the magnification of the SEM. In the case, where the measurement by SEM imaging is impracticable, STM may be employed for measurement. In STM measurement, a voltage of 1 to 2.5 V is applied to the device, and the probe of the STM is driven to scan the area to be measured from the negative potential side to the positive potential electrode side. In this measurement, the length of the region where 30% to 70% of the applied voltage is observed is taken as the voltage application length.

Further, the strength of the electric field applied to the electron-emitting device was investigated by the inventors of the present invention. It was found that a decrease of the voltage application length for the device voltage applied to the device leads to an increase of the electric field strength, and an electron emitting device exhibiting very weak ineffective current has an electric field strength of not less than $1\times10^7$ V/cm, where the electric field strength is calculated from E=Vf/L.

The control of the voltage application length and the electric field strength of the electron-emitting device was practiced as below. The gap between the electrodes was set in the range of from 0.2 to 5 μm. An electroconductive film having sheet resistance of from $3\times10^3$ Ω/square to $10^7$ Ω/square was formed. To the electroconductive film, a specified wave form of voltage pulse was applied through the electrodes. The applied voltage pulse is suitably decided depending on the shape of the electrodes, the material of the electroconductive film, and the material of the substrate. The electroconductive film is preferably formed, as described later in Examples, by placing electroconductive particles of from 5 to 1000 Å in particle diameter in dispersion between the electrodes, the material thereof is those mentioned above.

The electron-emitting devices of the above embodiments exhibit extremely small ineffective current, the ineffective current being 2% or less, in more preferred embodiment, 1% or less. The electron-emitting device of any embodiment of the present invention is excellent in electron-emitting characteristics such as electron emission quantity, electron emission efficiency, and emission stability (prevention of flickering of electron emission).

Figure 19:
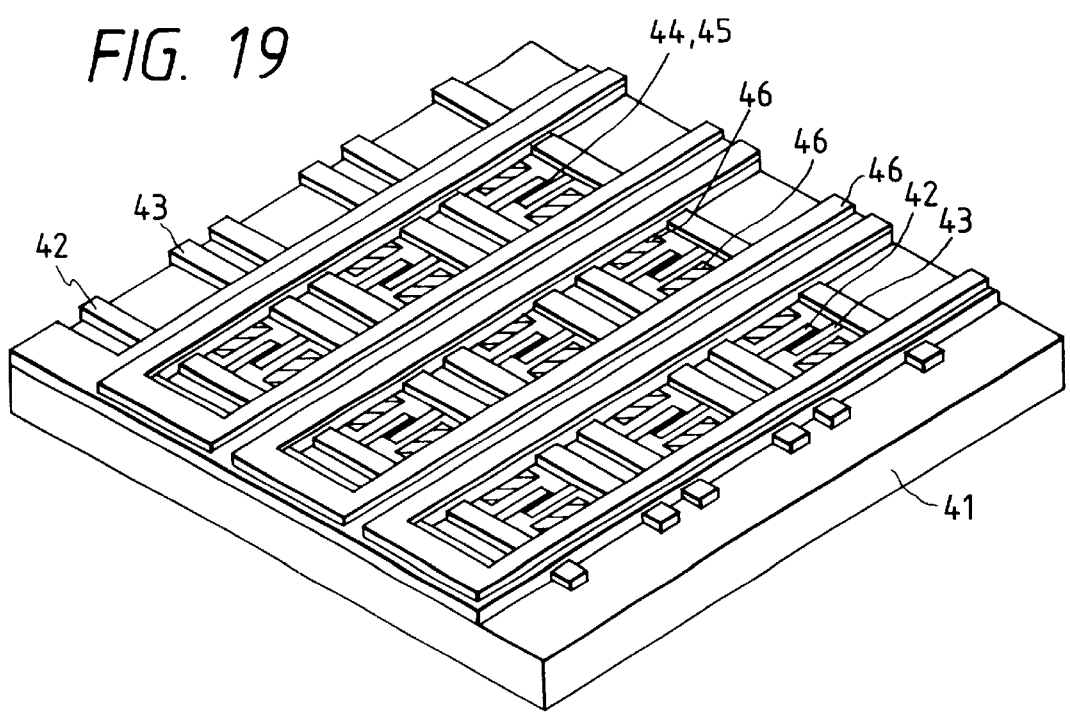
FIG. 19 is a perspective view illustrating schematically still an other electron beam-generating apparatus of the present invention.
Figure 20:
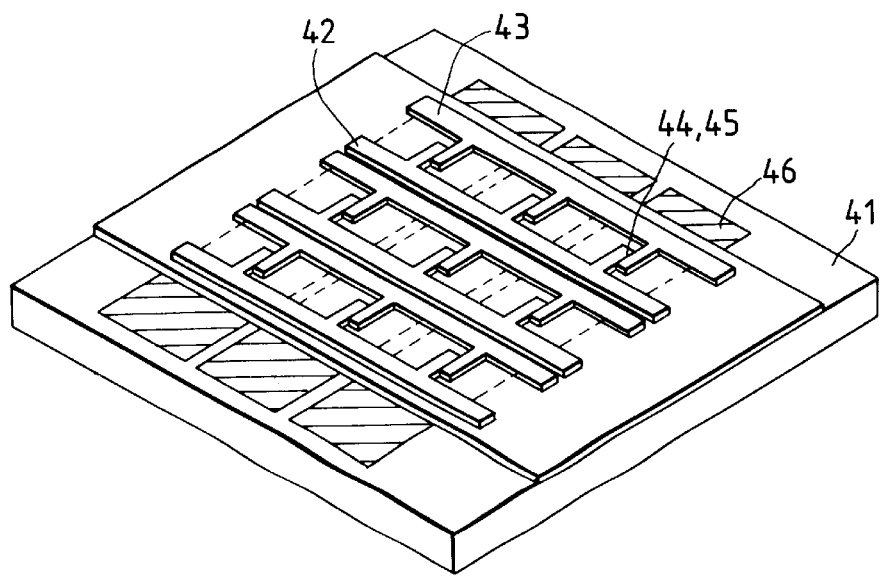
FIG. 20 is a perspective view illustrating schematically still another electron beam-generating apparatus of the present invention.

The electron beam-generating apparatus and the image-forming apparatus of the present invention are described below in detail. The electron beam-generating apparatus and the image-forming apparatus of the present invention are characterized by use of the above-described electron-emitting devices. The electron beam-generating apparatus of the present invention comprises a plurality of the above electron-emitting devices, and modulation means for modulating electron beams emitted from the electron-emitting devices in accordance with information signals. Some of the embodiments are explained by reference to FIGS. 18, 19, 20, and 21. In these drawings, the numeral 41 denotes an insulating substrate; 42 and 43, electrodes; 45, an electron-emitting region; 44, an electroconductive film for obtaining sufficient electric contact between the electrode and the electron-emitting region; and 46, a modulation means. In the apparatuses shown in FIGS. 18, 19, and 20, linear electron-emitting devices having a plurality of electron-emitting regions are juxtaposed on the substrate, and a plurality of grid electrodes (modulation electrodes) 46 are placed in an XY matrix with the linear electron-emitting devices. The grid electrodes are placed above the electron-emitting face of the electron-emitting device in FIG. 18; juxtaposed on the same substrate plane as the electron-emitting devices in FIG. 19; and laminated on the electron-emitting devices by the aid of the substrate in FIG. 20. In the embodiment shown in FIG. 21, a plurality of electron-emitting devices having each a single electron-emitting portion are arranged in matrix, and each element is connected to a signal wiring electrode 50 and a scanning wiring electrode 51 as shown in the drawing. This construction is called a simple matrix construction, in which the signal wiring electrodes 50 and the scanning wiring electrodes 51 serves as the modulation means. The electron beam-generating apparatuses exemplified above are driven as below. To drive the apparatus illustrated in FIG. 18, 19, or 20, a pulsing voltage of 10 to 35 V is applied to the electrodes 42 and 43 of one line of the linear electron-emitting devices to cause emission of electron beams from a plurality of the electron-emitting portions. The emitted electron beams are turned on and off by application of voltage of from 50 V to –70 V to the grid electrodes 46 in correspondence with information signals to obtain electron emission corresponding the information signals for the one line. Such operation is conducted sequentially for the adjacent lines of the linear electron-emitting devices to obtain electron beam emission for one picture image. To drive the apparatus illustrated in FIG. 21, the pulsing voltage is applied with the scanning wiring electrode 51 to the plurality of electron-emitting devices on one line, and subsequently the pulsing voltage is applied to the signal wiring electrodes 50 in correspondence with information signals to obtain electron emission corresponding to information signal for one line. Such operation is conducted sequentially for adjacent lines to obtain electron beam emission for one picture image.

Several examples are described above. The electron beam-generating apparatus of the present invention is advantageous in that the ineffective current in the whole apparatus is extremely week, electron-emitting characteristics such as electron emission efficiency and electron emission stability are excellent, and power consumption is low.

An image-forming apparatus of the present invention is explained below. The image-forming apparatus of the present invention has a constitution such that an image-forming member is placed on the electron beam emission side of the aforementioned electron beam-generating apparatus. The image-forming member is constituted of a material which causes light emission, color change, electrification, denaturing, etc. on collision of electrons, such as a light-emitting material like a fluorescent material, and a resist material. FIG. 22 illustrates one embodiment of an image-forming apparatus of the present invention. The apparatus of FIG. 22 comprises a rear plate 52 (which may serve also as the aforementioned insulating substrate 41), modulation means 46 (which are shown in a form of grid electrodes of FIG. 18, but may be the grid electrodes of FIG. 19 or FIG. 20, or the modulation means of FIG. 21), electrodes 42 and 43, electron-emitting regions 45, electroconductive films 44 for obtaining sufficient electric contact between the electrodes and the electron-emitting regions, a face plate 58, a glass plate 57, a transparent electrode 55, and a fluorescent material 56. To drive the image-forming apparatus of the present invention, voltage of from 0.5 KV to 10 KV is applied to the image-forming member (transparent electrode 55 in FIG. 22), and then the apparatus is driven in the same manner as driving of the above-described electron beam-generating apparatus, thus, an image corresponding to information signals is obtained on the image-forming member (fluorescent image in FIG. 22). In the case where the image-forming member is made of a light-emitting material such as a fluorescent material, a full-color image display can be obtained by using three light-emitting materials of three primary colors of red, green, and blue for one picture element. The electron beam-generating apparatus and the image-forming apparatus described above are usually driven at a vacuum of $10^{-4}$ to $10^{-9}$ torr.

Figure 28:
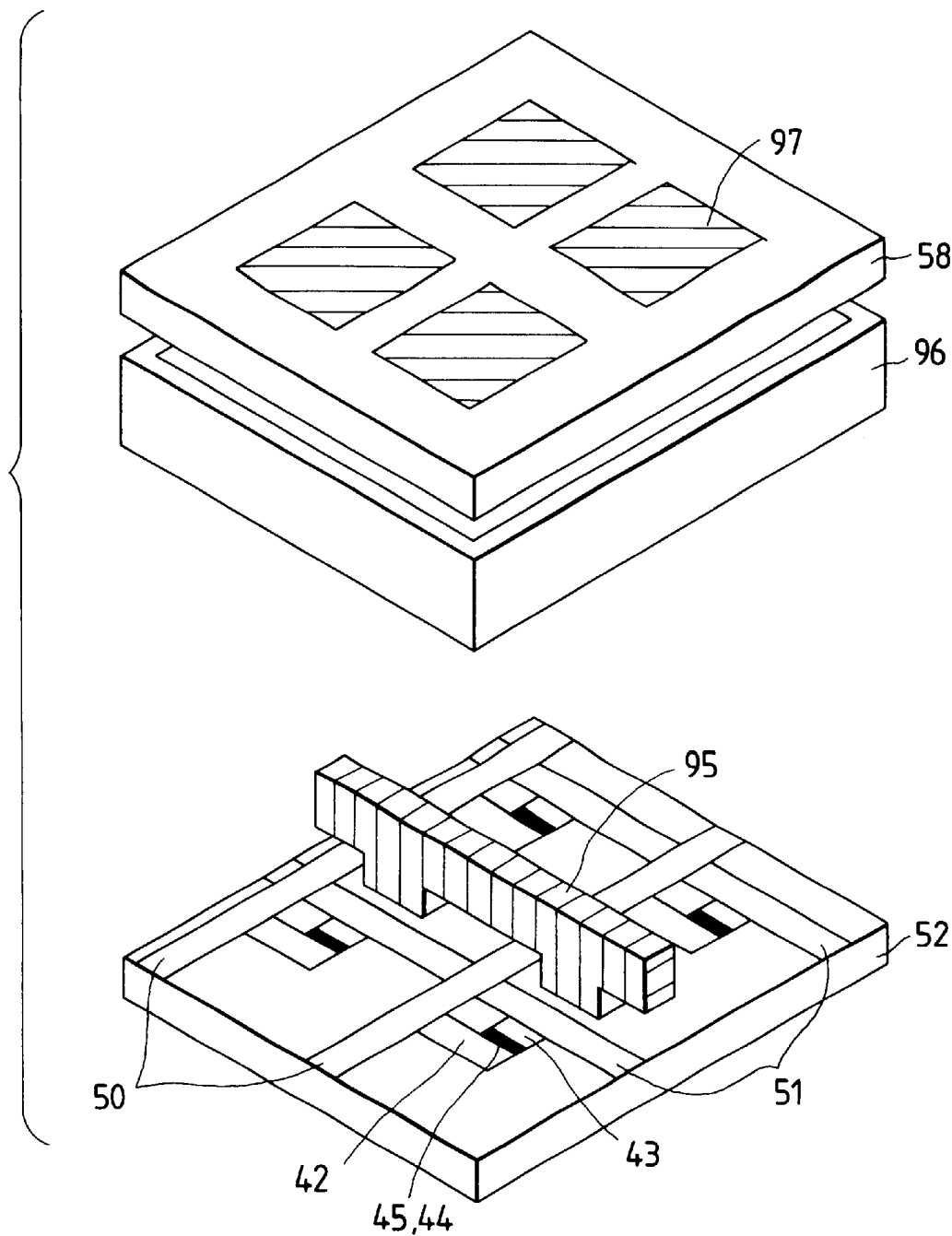
FIG. 28 illustrates schematically an image forming apparatus provided with a supporting member of the present invention (assembling drawing).
Figure 29:
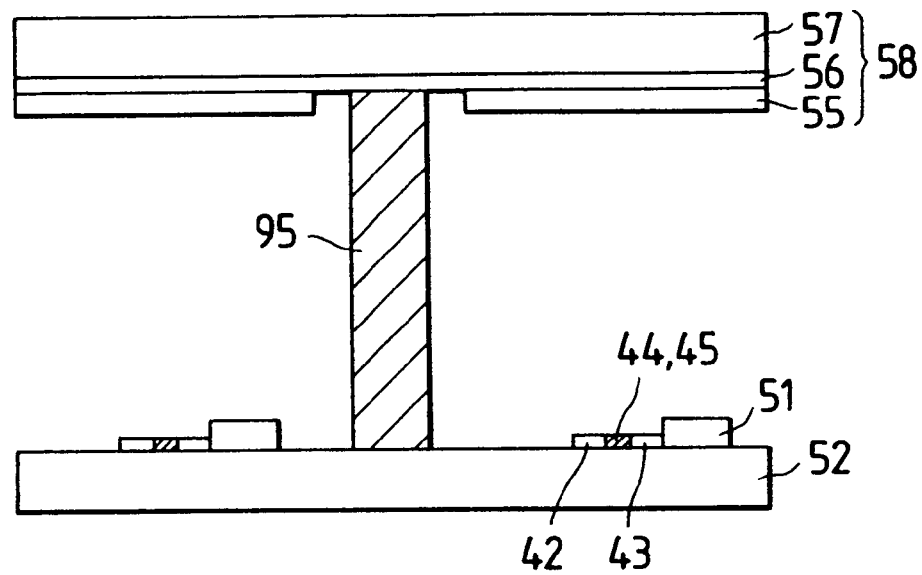
FIG. 29 is a sectional view of the apparatus of FIG. 28.
Figure 30:
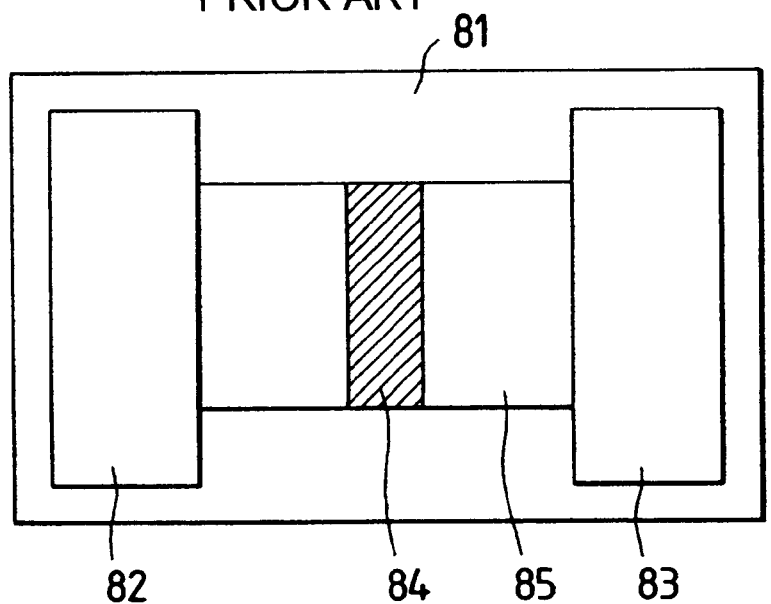
FIG. 30 is a plan view illustrating schematically construction of a conventional electron-emitting device.
Figure 31:
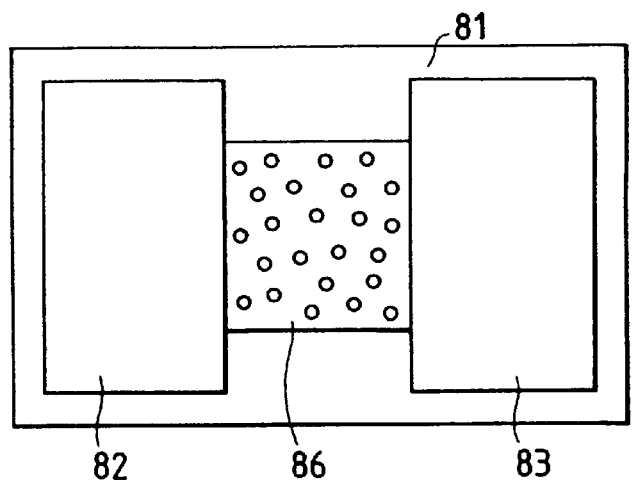
FIG. 31 is a plan view illustrating schematically construction of another conventional electron-emitting device.
Figure 32:
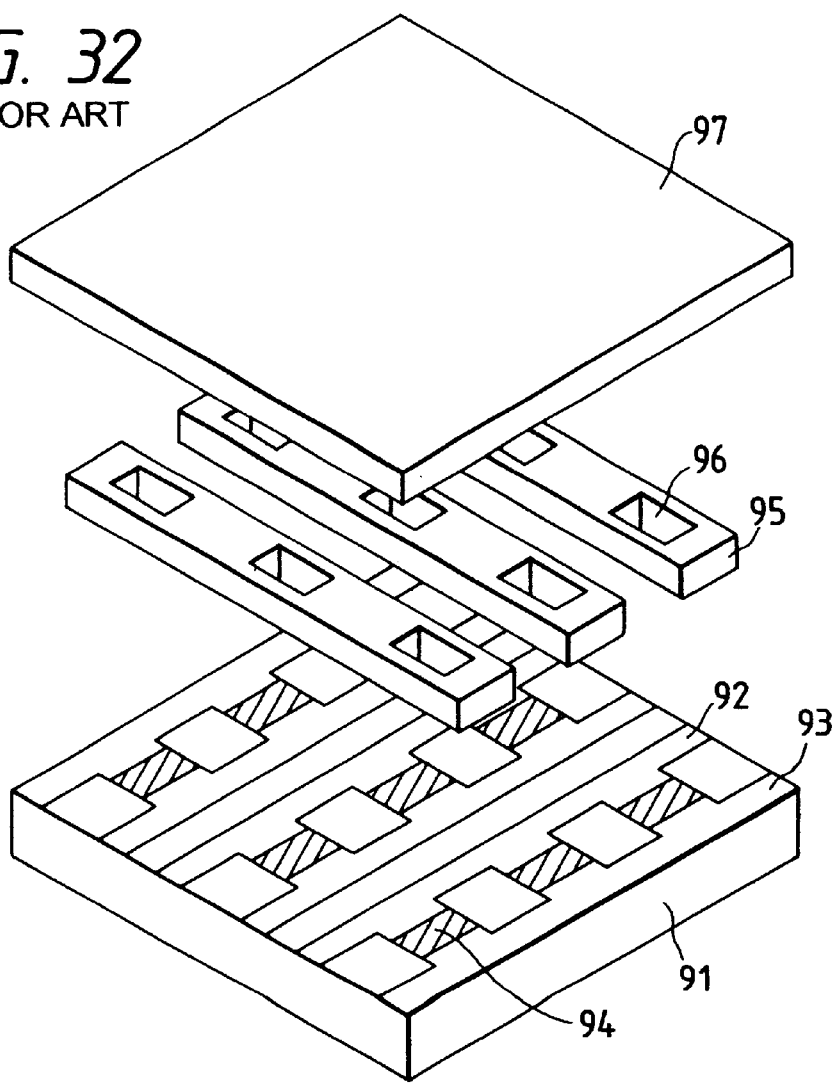
FIG. 32 is a perspective view of a conventional image-forming apparatus.

The image-forming apparatus of the present invention includes the embodiment shown in FIG. 28 and FIG. 29. In the image forming apparatus shown by FIG. 28, a supporting member for supporting the atmospheric pressure is provided between the face plate 58 and the rear plate 52 in the image-forming apparatus of FIG. 23, FIG. 24, or FIG. 25. FIG. 28 illustrates schematically the construction of an image-forming member of the present invention. FIG. 29 is a sectional view of the image-forming apparatus viewed at around the atmospheric pressure-supporting member of the image-forming apparatus shown in FIG. 28. In FIG. 28, the numeral 95 denotes an atmospheric pressure-supporting member; 96, a supporting frame; and 97, a luminescent spot of the fluorescent substance. An envelope of the image-forming apparatus is constructed of a face plate 58, a rear plate 52, and a supporting frame 96. The internal pressure is kept at a vacuum of $10^{-4}$ to $10^{-9}$ torr.

In an image-forming apparatus having no atmospheric pressure-supporting member, the larger the picture to be formed, the higher is the total atmospheric pressure given to the face plate 58 and the rear plate 52, and to support the increased pressure, the face plate 58 and the rear plate 52 have to be made thick, which inevitably increases the weight of the apparatus. To avoid this disadvantage, an atmospheric pressure-supporting member is provided desirably. The atmospheric pressure-supporting members 95 are placed usually at intervals of from 1 mm to 100 mm between the picture elements so that image defect may be avoided. The material of the atmospheric pressure-supporting member 95 is an insulating material such as glass.

When the image-forming apparatus having an atmospheric supporting member 95 as shown in FIG. 28 and FIG. 29 is driven, the supporting member is liable to be electrically charged by unexpected collision of electron beam or ions against the supporting member 95 since the supporting member 95 is electrically floating. This electric charging bends the locus of the electron beam and changes the amount of the electron beam colliding to the fluorescent material, causing irregularity of luminance and color. It was found by the present inventors that the disadvantage caused by the electric charging of the supporting member relates to driving voltage of the electron-emitting device. If the ineffective current of the electron-emitting device is large, the voltage applied to the device is high, and the supporting member 95 becomes liable to be charged. Accordingly, in the present invention, use of an electron-emitting device causing weak ineffective current makes it possible to obtain image-forming apparatus with large picture area and light weight.

Figure 27:
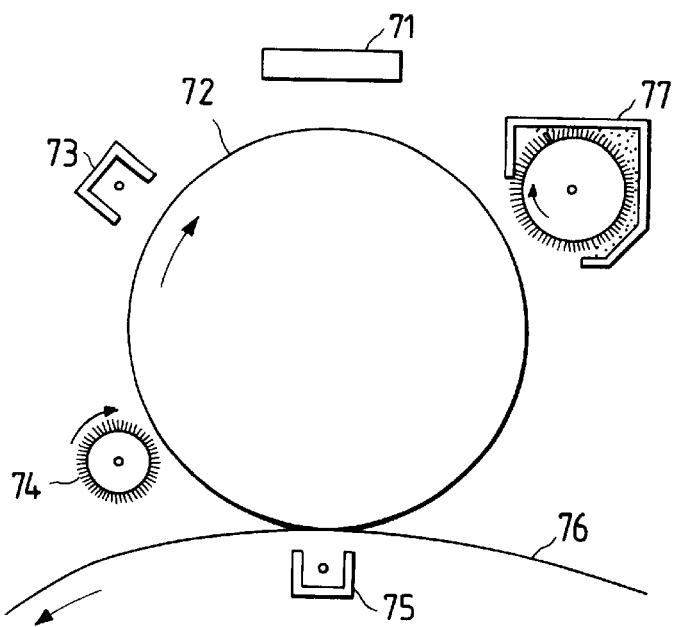
FIG. 27 illustrates schematically another image-forming apparatus (optical printer) of the present invention.
Figure 26A:
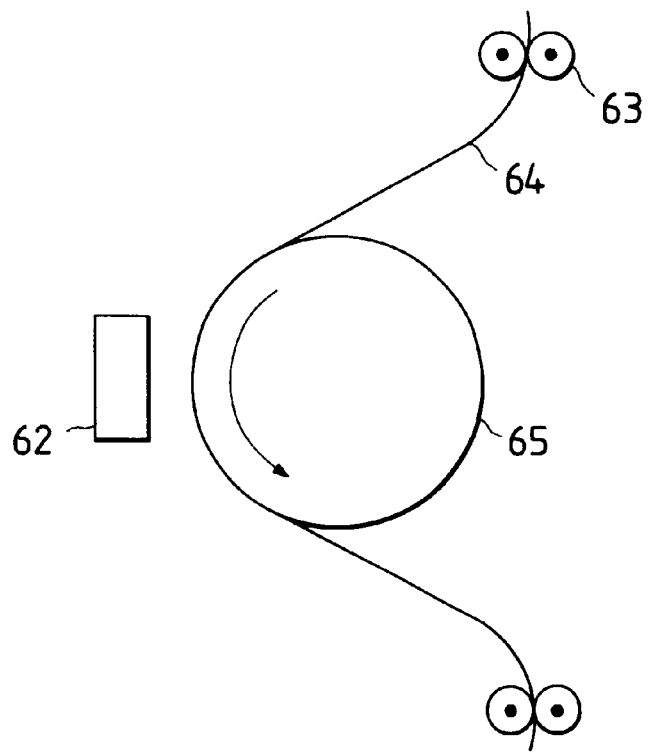
FIGS. 26A and 26B illustrate schematically an image-forming apparatus (optical printer) of the present invention.
Figure 26B:
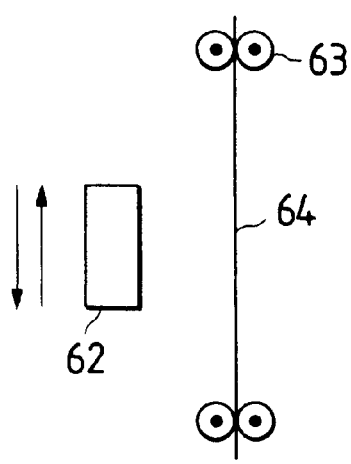

The image-forming apparatus of the present invention includes the embodiments shown in FIG. 26 and FIG. 27, which are examples of optical printers employing as the light source the image-forming apparatus illustrated in FIG. 22. In FIG. 26, the numeral 62 denotes the light source; 65 a drum; 63, a delivery roller; and 64, a heat-sensitive or light-sensitive sheet. The optical printer records image on a recording medium by driving the light source as described above (as driving of the image-forming apparatus of FIG. 22) to emit light in correspondence with information signals onto the recording medium 64 with scanning of the recording medium 64 supported by a support 65 or 63, or the light source 62. FIG. 27 illustrates another embodiment of the optical printer. The numeral 71 denotes a light source; 72, a drum-shaped recording medium; 77, a developer; 75, a static eliminator; 74, a cleaner; 73, an electric charger; and 76, an image-transfer medium. This optical printer records an image by electrically charging the recording medium 72 with an electric charger 73, projecting light beam emitted from the light source 71 in a manner as above (driving method of the image-forming apparatus of FIG. 22) to the recording medium 72 to eliminate electric charge from the illuminated area, adhering a toner on the non-illuminated area by means of a developer 77, and transferring the toner onto the image-transfer medium 76 by eliminating the electric charge at the position of the static eliminator 75.

The image-forming apparatus of the present invention as described above is capable of forming image with high contrast and sharpness with less consumption of electric power. In particular, the image-forming apparatus utilizing luminescent image gives extremely small variation or flickering of the luminance.

The present invention is described in more detail below by reference to Examples.

EXAMPLE 1

Electron-emitting devices of the type shown in FIGS. 1 to 3 were prepared. The procedure of the preparation is described below by reference to FIG. 11.

Figure 11A:
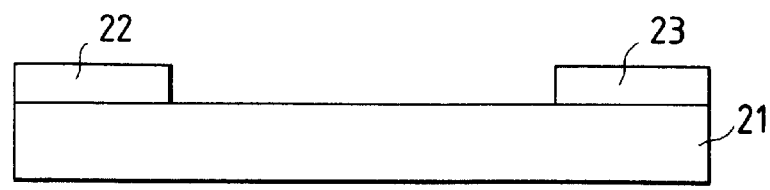
FIGS. 11A to 11C are drawings to explain a method for preparing the electron-emitting device of the present invention (sectional view).

(1) A quartz substrate as the insulating substrate 21 was cleaned sufficiently with an organic solvent, and on the face of the substrate 21, electrodes 22 and 23 were formed (see FIG. 11A). Metallic nickel was used as the material for the electrodes. The gap G between the two electrodes was 3 $\mu$m, the length of the electrodes was 500 $\mu$m, and the thickness thereof was 1000 Å.

Figure 11B:
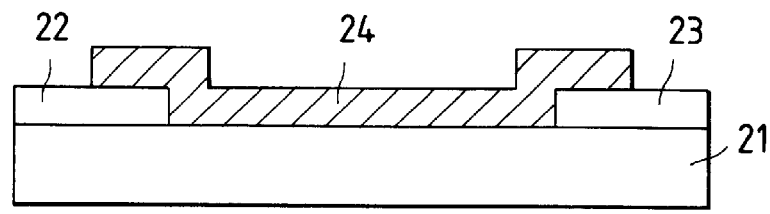

(2) Organic palladium (CCP-4260, made by Okuno Seiyaku K. K.) was applied thereon, and the applied matter was heat-treated at 300° C. to form a fine particle film 24 composed of palladium oxide (PdO) (average particle diameter: 20 Å). The fine particle film 24 had a length of 300 $\mu$m and was placed around the midpoint between the electrodes 22, 23 (FIG. 11B).

Figure 11C:
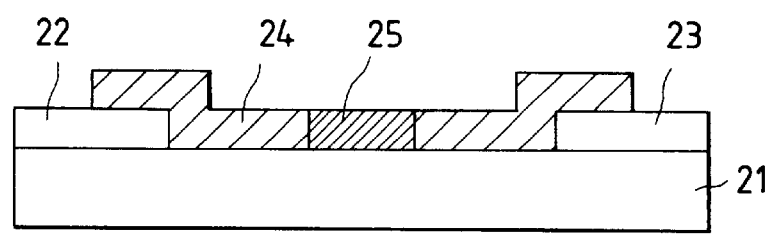

(3) Then, as shown in FIG. 11C, an electron-emitting region 25 was formed by forming treatment: that is, electric current is made to flow through the fine particle film 24 by application of voltage between the electrode 22 and the electrode 23. The wave form of the applied voltage in the forming treatment is shown in FIG. 12.

Figure 12:
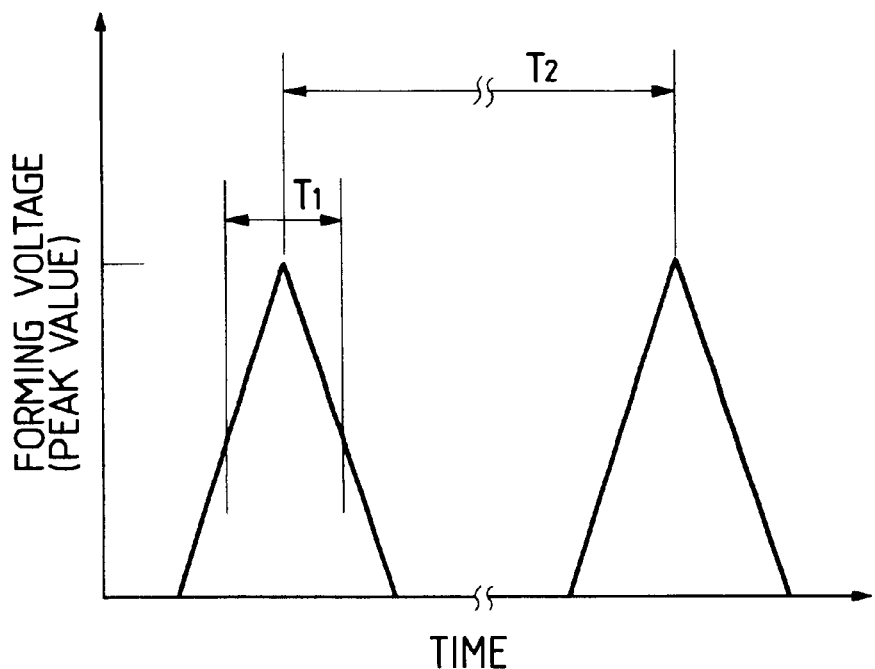
FIG. 12 shows a wave form of the pulse voltage on forming treatment of an electron-emitting device of the present invention.

In FIG. 12, the pulse width $T_1$ was 1.0 millisecond, and the pulse interval $T_2$ was 10 milliseconds in this example. The forming treatment was conducted at the forming voltage as shown below. under a vacuum environment of about $1 \times 10^{-6}$ torr. The electron-emitting region 25 was formed between the fine palladium oxide film 4, and was composed of fine palladium particles 6 as shown in FIG. 3. The fine particles 6 had an average diameter of 10 Å.

Three devices of different areal occupation ratio of the fine particles 6 were prepared by changing the amount of the coating of the organic palladium to change a sheet resistance of the fine particle film 24 in the step (2) and changing the forming voltage in the step (3).

1) Sheet resistance: $8 \times 10^4$ Ω/square
   Forming voltage: 4 V:
     Areal occupation ratio of fine particles: 75%
2) Sheet resistance: $3 \times 10^4$ Ω/square
   Forming voltage: 7 V:
     Areal occupation ratio of fine particles: 50%
3) Sheet resistance: $5 \times 10^3$ Ω/square
   Forming voltage: 13 V:
     Areal occupation ratio of fine particles: 20%

Figure 16:
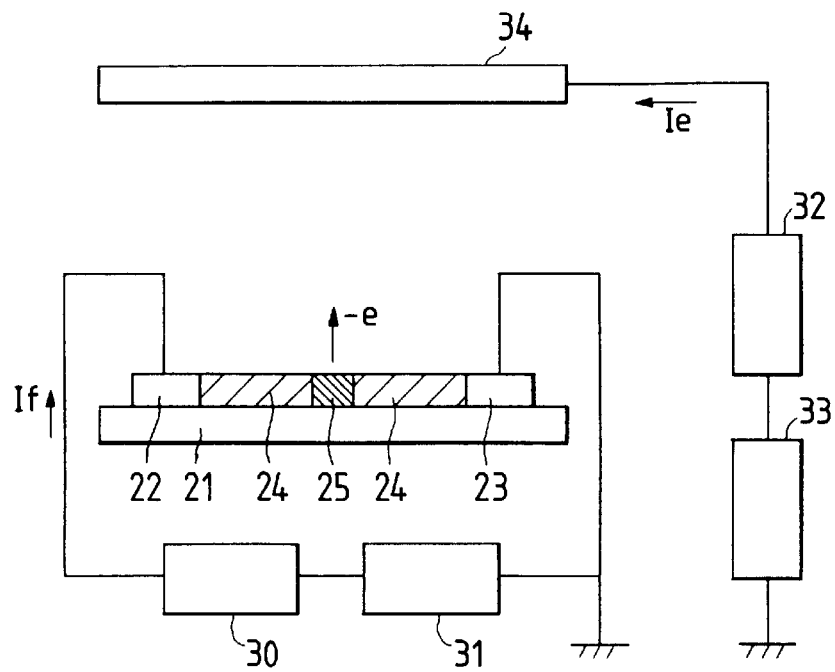
FIG. 16 illustrates schematically the construction of the measurement apparatus of electron emission characteristics of an electron-emitting device.

The devices were tested for electron emission characteristics by means of the evaluation apparatus illustrated in FIG. 16 under a vacuum of $1 \times 10^{-7}$ torr. The results are shown in Table 1.

Measurement Method

Figure 6:
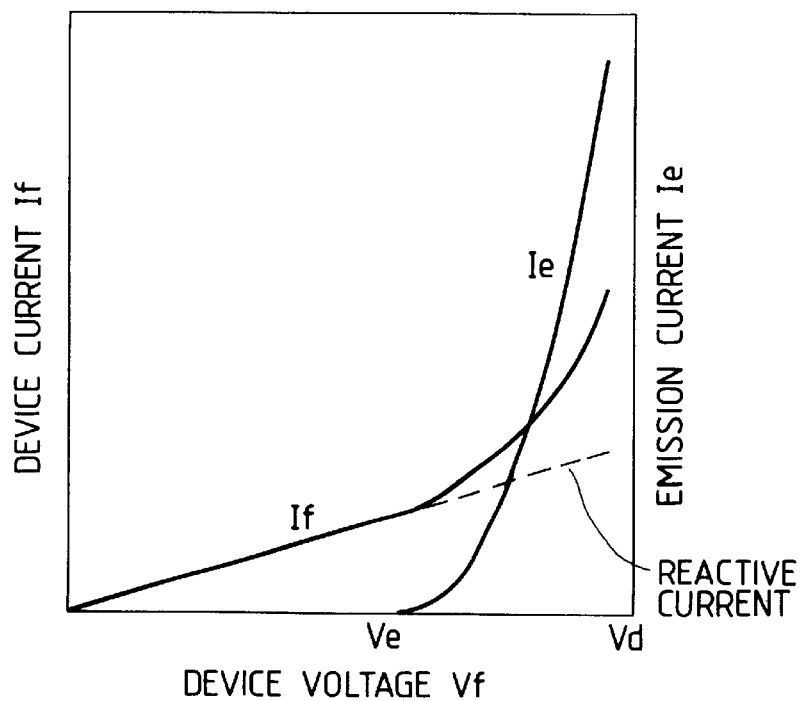
FIG. 6 shows current-voltage relation of a conventional electron-emitting device.
Figure 7:
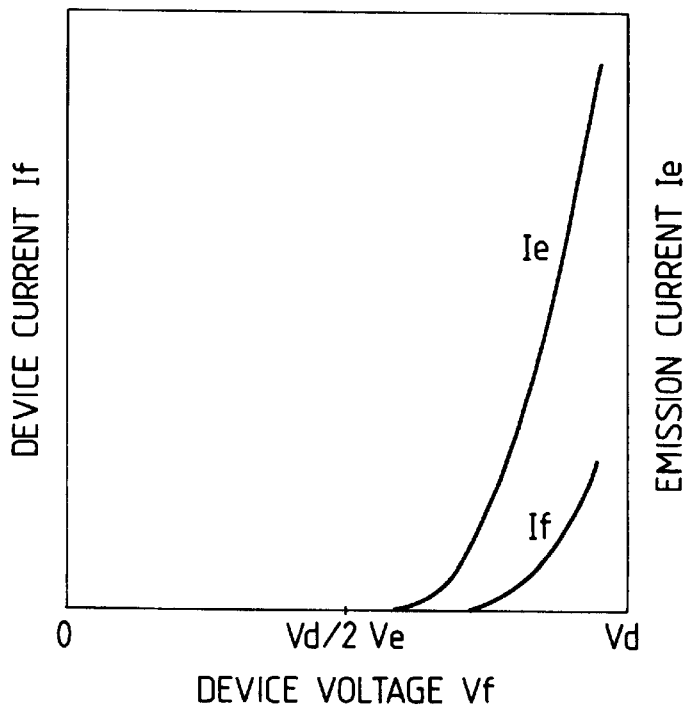
FIG. 7 shows current-voltage relation of an electron-emitting device of the present invention.

FIG. 16 illustrates schematically the construction of the measuring apparatus. The measuring apparatus comprises an insulating substrate 21, electrodes 22 and 23, an electron-emitting region 25, electroconductive films 24 for obtaining electric contact, a power source 31 for applying voltage to the device, an ammeter 30 for measuring the device current (If), an anode electrode 34 for measuring emission current (Ie) emitted from the device, a high-voltage power source 33 for applying voltage to the anode electrode 34, and an ammeter 32 for measuring the emission current. The aforementioned device current means the current measured by the ammeter 30, and the emission current means the current measured by the ammeter 32. The device current and the emission current of the electron-emitting device are measured by connecting the power source 31 and the ammeter 30 to the electrodes 22 and 23, and placing, above the electron-emitting device, the anode electrode 34 connected to the power source 33 and the ammeter 32 under a vacuum of $1 \times 10^{-5}$ torr. From the results of the measurement as shown in FIG. 6, the ineffective current is calculated as below:

ineffective current=$(Ix/If) \times 100(\%)$ where If is the device current at a drive voltage Vd, and Ix is the extrapolated value, at the drive voltage Vd, of the straight line through the point of the device current at the device voltage of zero and the point of the device current at the device voltage Ve where the device begins electron emission.

EXAMPLE 2

Electron-emitting devices were prepared by the procedure below.

(1) A pair of electrodes were formed on an insulating substrate in the same manner as in step (1) in Example 1.

(2) A fine particle film 24 was formed in the same manner as in step (2) in Example 1 (FIG. 11B). The resulting fine particle film was heated in a reducing atmosphere (a mixture of hydrogen gas and nitrogen gas) at 350° C., and then in the air at 350° C. Thereby, the fine palladium oxide particles of 70 Å in diameter grew to have a diameter of 500 Å. As the results, the resulting fine palladium oxide film 24 was composed of particles larger in diameter than the particles of Example 1. The sheet resistance of the fine particle film 24 was $2 \times 10^4$ Ω/cm².

Figure 13:
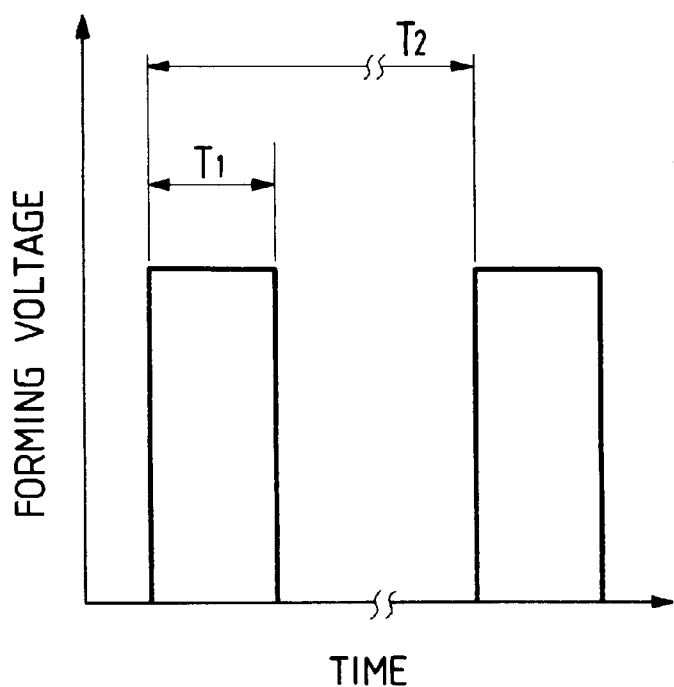
FIG. 13 shows another wave form of the pulse voltage on forming treatment of an electron-emitting device of the present invention.

(3) The fine palladium oxide film 24 prepared in the above step (2) was subjected to the forming treatment with the voltage wave form as shown in FIG. 13. In this Example, the pulse width $T_1$ was 10 milliseconds, and the pulse interval $T_2$ was 100 milliseconds.

Two kinds of devices were prepared by changing the voltage in the forming treatment.

1) Forming voltage 6 V:
   Average diameter of fine particles 6: 40 Å
   Areal occupation ratio of fine particles 6: 60%
2) Forming voltage 13 V:
   Average diameter of fine particles 6: 300 Å
   Areal occupation ratio of fine particles 6: 35%

The devices were evaluated in the same manner as in Example 1. The results are shown in Table 1.

EXAMPLE 3

An electron-emitting device was prepared in the same manner as in Example 2 except that the sheet resistance of the fine particle film 24 was $5 \times 10^5$ Ω/square and the forming voltage was 4 V. In the resulting device, the areal occupation ratio of the fine particles 6 was 50%, and the average particle diameter of the fine particles 6 was 5 Å. The electron-emitting device exhibited approximately the same effect as the ones in Example 2 (ineffective current being not more than 1%)

EXAMPLE 4

Electron-emitting devices were prepared as below.

(1) On an insulating substrate 21, electrodes 22 and 23 were formed with the electrode gap G of 1 μm (FIG. 11A) in the same manner as in Example 1.

(2) A fine particle film 24 was formed comprising fine palladium oxide particles (PdO, particle diameter: 20 to 80 Å, FIG. 11B) in the same manner as in Example 1. This fine particle film was heated in a reducing atmosphere (a gas mixture of hydrogen and nitrogen) at about 200° C. to give a fine palladium (Pd) particle film (particle diameter: 15 to 60 Å). The length of the fine particle film was 300 μm.

(3) An electron-emitting region 25 was formed by application of voltage between the electrode 22 and the electrode 23 for forming treatment of the fine particle film 24. The forming treatment was conducted with the voltage wave form shown in FIG. 12. The pulse width $T_1$ was 10 microseconds, and the pulse interval $T_2$ was 500 microseconds. The forming treatment was conducted in a vacuum of about $1 \times 10^{-6}$ torr.

Three kinds of devices were prepared by changing the amount of the coating of the organic palladium to change the sheet resistance of the fine particle film 24 and by changing the forming voltage as below:

1) Sheet resistance: $1 \times 10^5$ Ω/square
   Forming voltage: 3.5 V
     Average gap between particles: 12 Å
     Average particle diameter: 30 Å
2) Sheet resistance: $5 \times 10^4$ Ω/square
   Forming voltage: 6.0 V
     Average gap between particles: 20 Å
     Average particle diameter: 35 Å

3) Sheet resistance: $3\times10^4$ Ω/square
   Forming voltage: 14 V
      Average gap between particles: 50 Å
      Average particle diameter: 40 Å

The devices were evaluated in the same manner as in Example 1. The results are shown in Table 2.

EXAMPLE 5

An electron-emitting device was prepared in the same manner as in Example 4 except that the sheet resistance of the fine particle film 24 was $1\times10^5$ Ω/square and the forming voltage was 4 V. In the resulting device, the average particle gap was 5 Å, and the average particle diameter was 50 Å. The electron-emitting device exhibited approximately the same effect as the ones in Example 4 (ineffective current being not more than 3%).

EXAMPLE 6

An electron-emitting device was prepared in the same manner as in Example 4 except that the sheet resistance of the fine particle film 24 was $5\times10^3$ Ω/square and the forming voltage was 14 V. In the resulting device, the average particle gap was 100 Å, and the average particle diameter was 50 Å. The electron-emitting device exhibited approximately the same effect as the ones in Example 4 (ineffective current being not more than 1%).

EXAMPLE 7

Electron-emitting devices were prepared as below.

(1) On an insulating substrate 21, electrodes 22 and 23 were formed in the same manner as in the step (1) in Example 4 (FIG. 11A).

(2) A fine particle film 24 of palladium (Pd) (particle diameter: 60 to 500 Å,) was formed in the same manner as in the step (2) in Example 4 except that the temperature of heating in the reducing atmosphere was 370° C. (FIG. 11B).

(3) An electron-emitting region 25 as shown in FIG. 11C was formed by forming treatment. The forming treatment was conducted with the voltage wave form shown in FIG. 13, the pulse width $T_1$ of 50 microseconds, and the pulse interval $T_2$ of 500 microseconds.

Two kinds of devices were prepared by changing the amount of coating to change the sheet resistance of the fine particle film 24, and by changing the forming voltage.

1) Sheet resistance: $5\times10^4$ Ω/square
   Forming voltage: 4.0 V
      Average gap between particles: 20 Å
      Average particle diameter: 40 Å

2) Sheet resistance: 7×103 Ω/square
   Forming voltage: 12 V
      Average gap between particles: 35 Å
      Average particle diameter: 300 Å

The devices were evaluated in the same manner as in Example 1. The results are shown in Table 2.

EXAMPLE 8

An electron-emitting device was prepared in the same manner as in Example 7 except that the sheet resistance of the fine particle film 24 was $3\times10^5$ Ω/square and the forming voltage was 4 V. In the resulting device, the average particle gap was 30 Å, and the average particle diameter was 5 Å. The electron-emitting device exhibited approximately the same effect as the ones in Example 7 (ineffective current being not more than 1.0%).

EXAMPLE 9

Electron-emitting devices were prepared as below. The procedures explained by reference to FIG. 14.

Figure 14A:
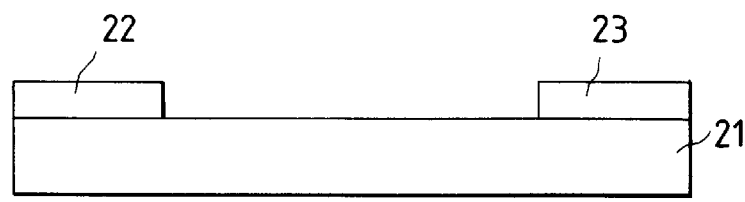
FIGS. 14A to 14E are drawings to explain a method for preparing the electron-emitting device of the present invention (sectional view).
Figure 14B:
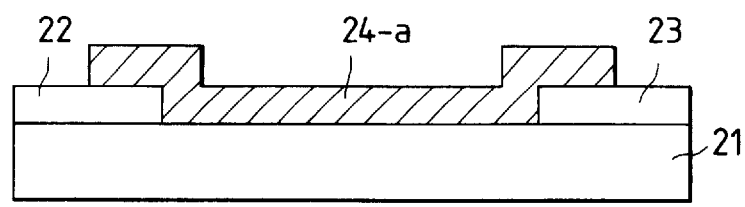
Figure 14C:
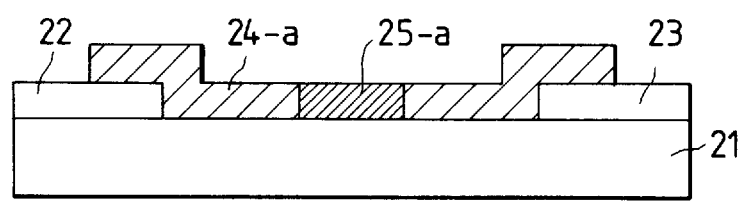

The steps of FIGS. 14A to 14C were practiced in the same manner as in the steps (1) to (3) in Example 1 except that the forming treatment was conducted with the voltage wave form as shown in FIG. 12 at the forming voltage of 8 V, the pulse width of $T_1$ of 1 millisecond, and the pulse interval $T_2$ of 10 milliseconds.

Figure 14D:
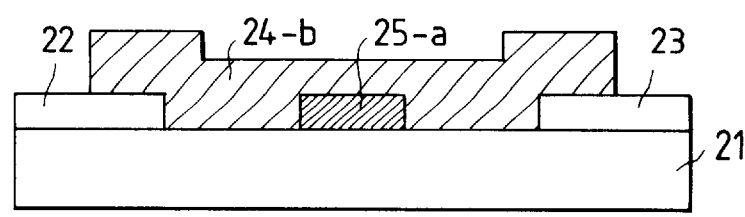

(4) As shown in FIG. 14D, organic palladium (CCP-4260, made by Okuno Seiyaku K.K.) was applied at a desired position by dipping. The applied matter was heat treated at 320° C. to form a fine particle film 24-*b* composed of fine particle of palladium oxide (PdO) on the electron-emitting region 25-*a*.

Figure 14E:
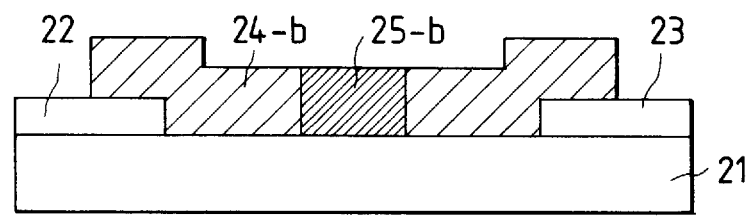

(5) Then as shown in FIG. 14E, the electron-emitting region 25-*b* was formed by forming treatment conducted in the same manner as before. In this treatment, the electron-emitting region 25-*b* was formed nearly the same position as the initially formed electron-emitting region 25-*a*. Repetition of the steps of (4) and (5) of this Example enables the control of the gaps of fine palladium particles 6. Thereby, three kinds of devices were prepared as below.

1) The steps (4) and (5) were conducted three times:

| | |
|---|---|
| Average gap of fine particles: | 12Å |
| Average diameter of fine particles: | 35Å |
| Areal occupation ratio of fine particles: | 65% |

2) The steps (4) and (5) were conducted twice:

| | |
|---|---|
| Average gap of fine particles: | 20Å |
| Average diameter of fine particles: | 30Å |
| Areal occupation ratio of fine particles: | 50% |

3) The steps (4) and (5) were conducted once:

| | |
|---|---|
| Average gap of fine particles: | 50Å |
| Average diameter of fine particles: | 25Å |
| Areal occupation ratio of fine particles: | 30% |

The devices were evaluated in the same manner as in Example 1. The results are shown in Table 3.

EXAMPLE 10

An electron-emitting device was prepared in the same manner as in Example 9 except that the steps (4) and (5) were conducted four times. In the resulting electron-emitting device, the areal occupation ratio of the of the fine particles in the electron-emitting region was 75%, the average particle diameter of the fine particles was 35 Å, and the average gap of the fine particles was 5 Å. The device was evaluated in the same manner as in Example 9. The effect was nearly the same as that of Example 9 (ineffective current: not more than 2.0%).

EXAMPLE 11

An electron-emitting device was prepared in the same manner as in Example 9 except that in the step (4) the forming voltage was 12 V. In the resulting electron-emitting device, the areal occupation ratio of the fine particles in the electron-emitting region was 20%, the average particle diameter of the fine particles was 25 Å, and the average gap of the fine particles was 100 Å. The device was evaluated in the same manner as in Example 9. The effect was nearly the same as that of Example 9 (ineffective current: not more than 0.2%).

EXAMPLE 12

An electron-emitting device was prepared in the same manner as in Example 9 except that in the step (4) the forming voltage was 12 V, and the steps (4) and (5) were conducted twice. In the resulting electron-emitting device, the areal occupation ratio of the of the fine particles in the electron-emitting region was 50%, the average particle diameter of the fine particles was 300 Å, and the average gap of the fine particles was 30 Å.

The device was evaluated in the same manner as in Example 9. The effect was nearly the same as that of Example 9 (ineffective current: not more than 1.0

EXAMPLE 13

Electron-emitting devices were prepared as below. The procedures explained by reference to FIG. 15.

Figure 15A:
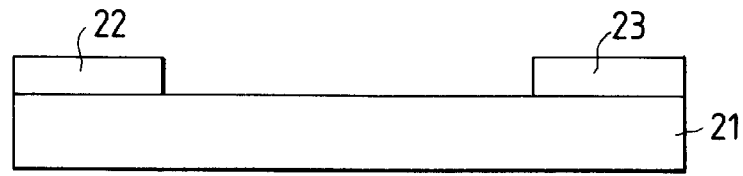
FIGS. 15A to 15D are drawings to explain a method for preparing the electron-emitting device of the present invention (sectional view).
Figure 15B:
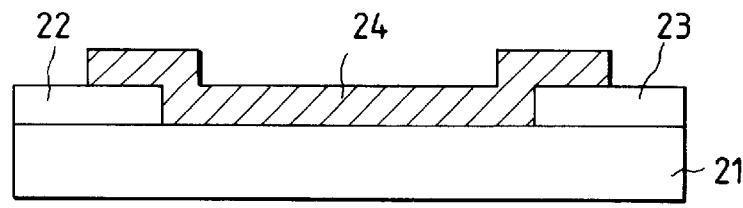

(1) and (2) The steps of FIGS. 15A and 15B were practiced in the same manner as in the steps (1) and (2) in Example 1.

Figure 15C:
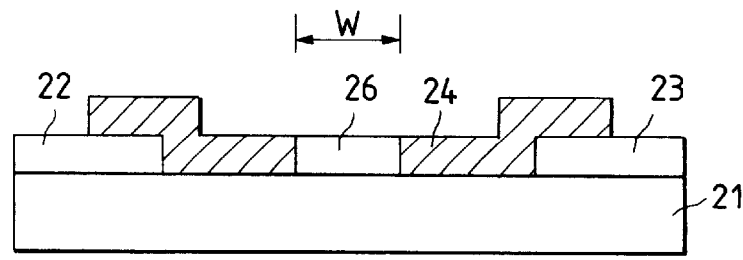

(3) A part of the fine palladium oxide particle film 24 is irradiated with electron beam to reduce the palladium oxide to form a fine particle film 26 composed of fine palladium particles (particle diameter: 15 to 60 Å) (FIG. 15C). The electron beam irradiation was practiced under the conditions of an electric current of 30 nA, an accelerating voltage of 30 kV, and a vacuum of $1 \times 10^{-6}$ torr. The fine palladium particle film 26 was formed in a width of 1000 Å around the center of the fine palladium oxide film 24.

Figure 15D:
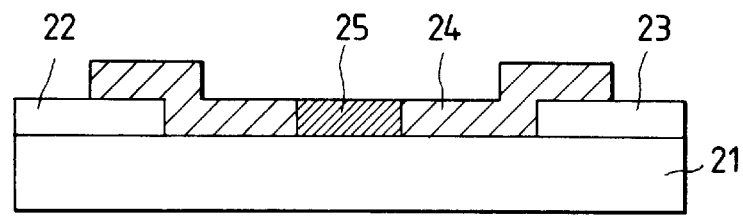

(4) Then as shown in FIG. 15D, the electron-emitting region 25 was formed by forming treatment. The forming treatment was practiced by applying voltage between the electrode 22 and the electrode 23 in the voltage wave form shown in FIG. 12 in the pulse width $T_1$ of 70 microseconds, and the pulse interval $T_2$ of 500 microseconds. Three kinds of devices were prepared by changing the forming voltage as below.

| 1) Forming voltage: 3.5 V: | |
|---|---|
| Average gap of fine particles: | 12Å |
| Average diameter of fine particles: | 25Å |
| Areal occupation ratio of fine particles: | 65% |
| 2) Forming voltage: 6.0 V: | |
| Average gap of fine particles: | 20Å |
| Average diameter of fine particles: | 28Å |
| Areal occupation ratio of fine particles: | 50% |
| 3) Forming voltage: 14 V: | |
| Average gap of fine particles: | 50Å |
| Average diameter of fine particles: | 35Å |
| Areal occupation ratio of fine particles: | 35% |

The devices were evaluated in the same manner as in Example 1. The results are shown in Table 3.

EXAMPLE 14

Figure 17:
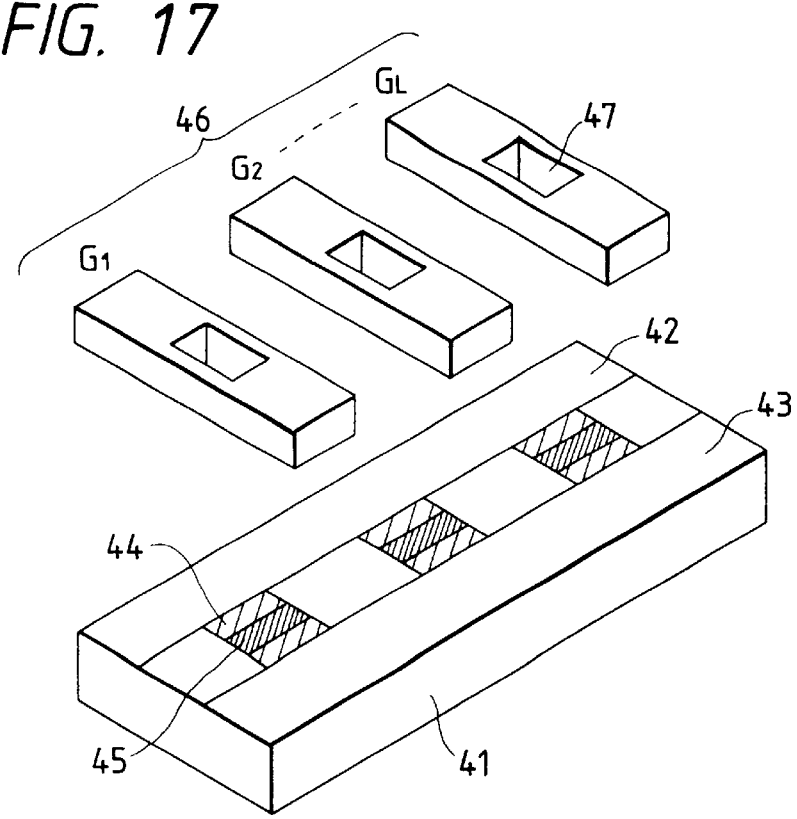
FIG. 17 is a perspective view illustrating schematically an electron beam-generating apparatus of the present invention.

An electron ray-generating apparatuses were prepared by arranging in a line a plurality of the electron-emitting devices prepared in Examples 1–13 as shown in FIG. 17. The apparatus comprises an insulating substrate (a rear plate) 41, wiring electrodes 42 and 43, low-resistance portions 44 having low electric resistance, electron-emitting regions 45, modulation means (grid electrodes) $G_1$ to $G_L$ (46), and electron-passing holes 47. The spacing between the insulating substrate 41 and the modulation means 46 was adjusted to 10 μm. The electron beam-generating apparatus was driven as described below. The apparatus was placed in the vacuum of $10^{-6}$ torr. Driving voltage (device voltage in Examples 1–13) was applied between the wiring electrodes. Then voltage of 30 V was applied to the modulation means in accordance with information signals. Thereby, electron beams were emitted from the plurality of the regions 45 in accordance with the information signals.

The electron beam-generating apparatuses of this Example consumed less electric power because the ineffective current in the device current was extremely low (2% or less). Therefore, the electron-emitting devices could be arranged in fine pitch in the apparatuses. Further, since the current flowing through the electrodes 42 and 43 was weak, the voltage drop between the electrodes 42 and 43 was small, and the quantities of the electron beams (or emission current) emitted from the elements were uniform. Therefore, many elements could be arranged between the electrodes 42 and 43.

From among the above electron-emitting devices in this Example, more effective were those of Example 1 (1) and (2), Example 2 (1), Example 3, Example 4 (1), (2), and (3), Example 5, Example 7 (1), Example 8, and in particular, Example 9 (1), (2), and (3), and Example 12 (1), (2), and (3) in that the driving voltage of the electron-emitting device was low, the emission current was strong, and variation of the emission current between the devices was small.

EXAMPLE 15

Figure 18:
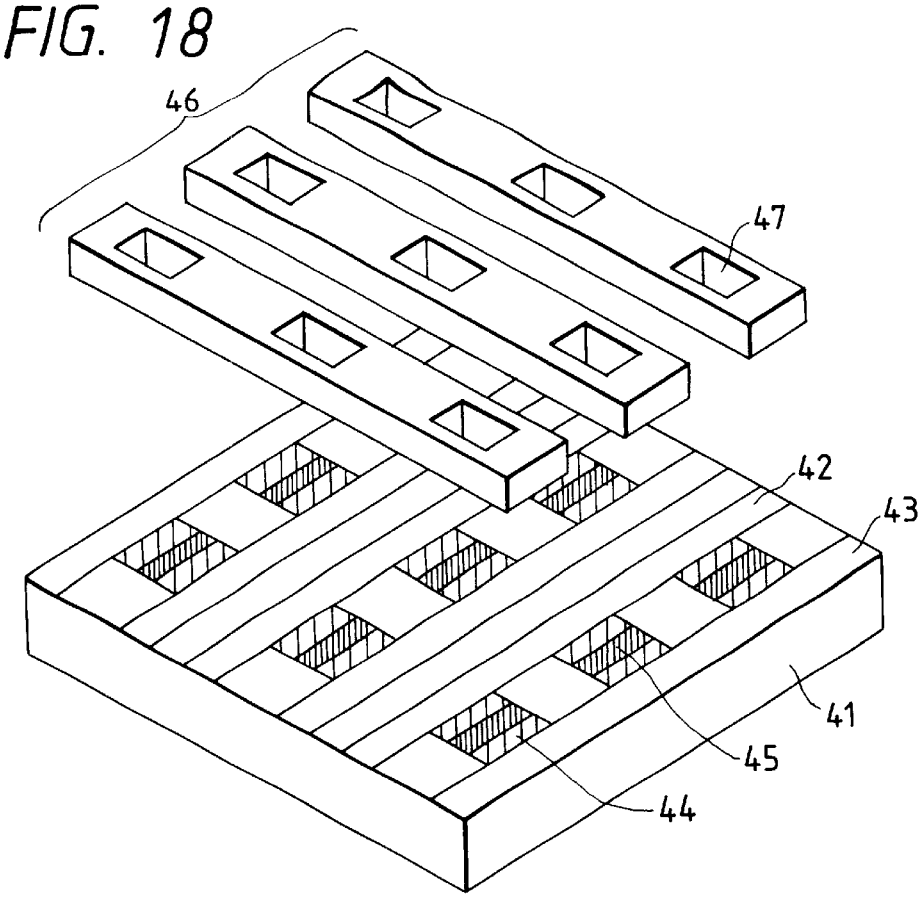
FIG. 18 is a perspective view illustrating schematically another electron beam-generating apparatus of th e present invention.

Electron beam-generating apparatus were prepared by arranging in lines a plurality of linear electron-emitting device groups comprising the electron-emitting devices of Examples 1–13, as shown in FIG. 18. The spacing between the insulating substrate 41 and the modulation means 47 was adjusted to 10 μm, and the interval between the linear electron-emitting device groups was adjusted to 1 mm. The electron beam-generating apparatus was driven as described below. The apparatus was placed in the vacuum of $10^{-6}$ torr. The driving voltage (device voltage in Examples 1–13) was applied between the wiring electrodes 42 and 43. Then voltage was applied to the modulation means 46 in accordance with information signals: the electron beam being controlled to be off at 0 V or lower, being controlled to be on at +30 V or higher, and to vary continuously between 30 V and 0 V. Consequently, electron beams were emitted from a plurality of electron-emitting region 45 in a line between the wiring electrodes 42 and 43 in accordance with the one line of information. This operation was conducted sequentially for adjacent lines of the linear electron-emitting device group to obtain electron emission for the entire information signals.

In this Example also, the similar effects as in Example 14 were confirmed.

EXAMPLE 16

Electron beam-generating apparatuses were prepared in the same manner as in Example 15 except that the modulation means (grid electrodes) 46 were placed on the face of the insulating substrate 41. The emission of electron beams could be made in accordance with information signals by driving the apparatus in a similar manner as in Example 15. In the apparatuses of this Example, the electron beams could be controlled by the voltage applied to the modulation means: to be off at −30 V or lower, to be on at +20 V or higher, and to vary continuously between −30 V and +20 V.

In this Example also, the similar effects as in Example 14 were confirmed.

EXAMPLE 17

An electron beam-generating apparatus was prepared in the same manner as in Example 15 except that the modulation means (grid electrodes) 46 were placed on the face of the insulating substrate opposite to the electron-emitting face of the linear electron-emitting device groups. The emission of electron could be made in accordance with information signals by driving the apparatus in a similar manner as in Example 15. In the apparatuses of this Example, the electron beams could be controlled by the voltage applied to the modulation means: to be off at −30 V or lower, to be on at +20 V or higher, and to vary continuously between −30 V and +20 V.

In this Example also, the similar effects as in Example 14 were confirmed.

EXAMPLE 18

Figure 21:
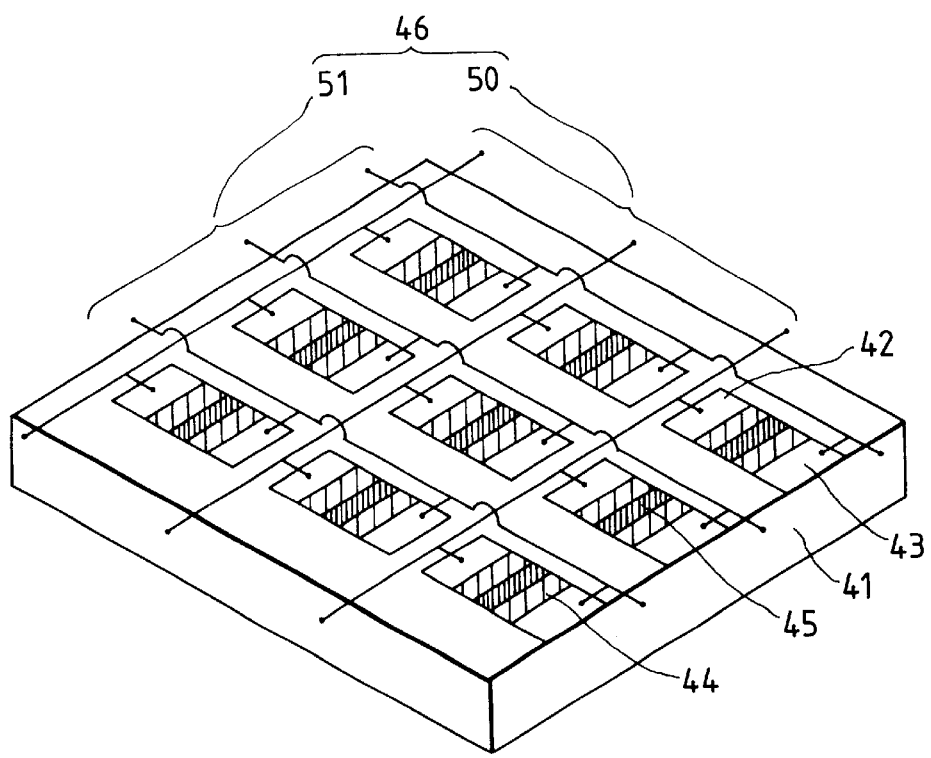
FIG. 21 is a perspective view illustrating schematically still another electron beam-generating apparatus of the present invention.
Figure 22:
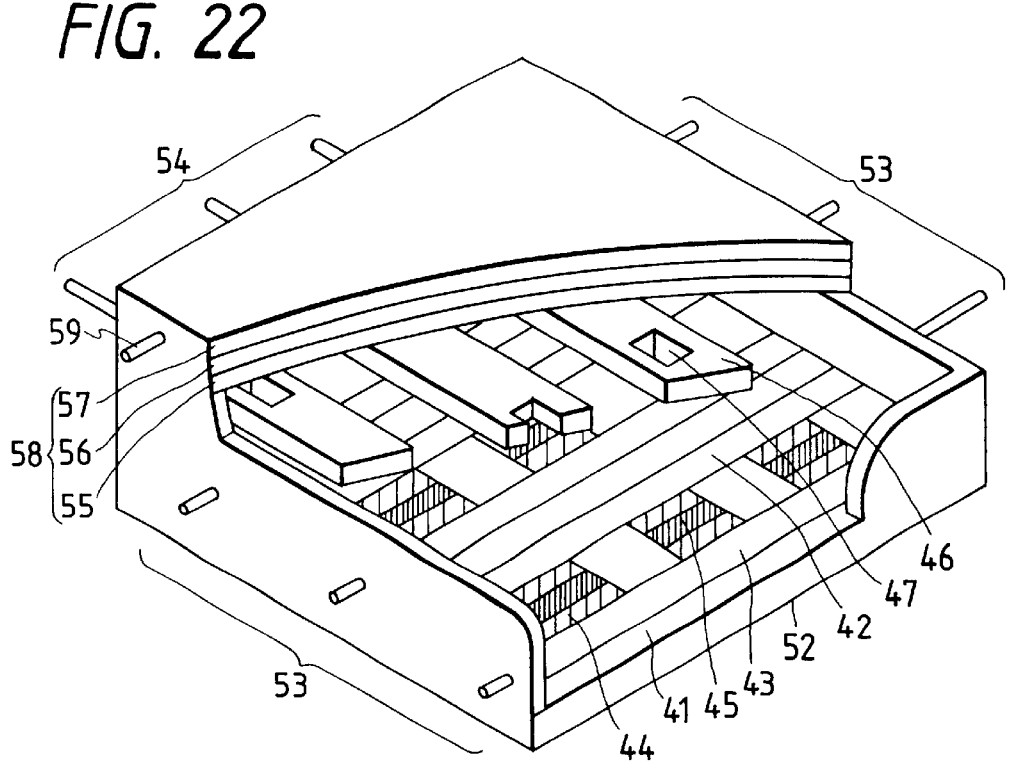
FIG. 22 is a perspective view illustrating schematically an image-forming apparatus of the present invention.

The electron beam-generating apparatus of this Example has the construction shown schematically in FIG. 21. In this apparatus having a simple matrix construction, a plurality of electron-emitting devices of any of Examples 1 to 13 are arranged in matrix, and each device is connected to a signal wiring electrode 50 and a scanning wiring electrode 51.

The apparatus was driven as below. The device voltage indicated in Examples 1 to 13 was applied to each of the electron-emitting devices to cause electron emission from the electron-emitting devices. First, a pulsing voltage of 0 V or half the device voltage was applied by the scanning wiring electrode 51 to one line of a plurality of the electron-emitting devices. Then another pulsing voltage of 0 V or half the device voltage was applied to the signal wiring electrode 50 in correspondence with information signals to obtain the electron beam emission in correspondence with the information signals for the one line. Such operation was conducted sequentially for adjacent lines to obtain electron beam emission for one picture image.

In this Example also, the similar effects as in Example 14 were confirmed.

EXAMPLE 19

An image-forming apparatus as shown in FIG. 22 was prepared by use of the electron beam-generating apparatus of Example 15. In FIG. 22, the numeral 58 denotes a face plate; 57, a glass plate; 55, a transparent electrode; and 56, a fluorescent material. The spacing between the face plate 58 and the rear plate 52 was adjusted to be 3 mm.

The image-forming apparatus was driven in a manner shown below. The panel vessel constructed from the face plate 58 and the rear plate 52 was evacuated to a vacuum of $10^{-6}$ torr; the voltage of the fluorescent material face was set through the EV terminal 59 at 5 KV to 10 KV; and pulsing voltage (namely the device voltage indicated in Example 1 to 13) was applied to a pair of wiring electrodes 42 and 43. Then voltage was applied to the modulation means through the wiring 54 to control the electron beam emission to be on or off in accordance with information signals: the electron beam being controlled to be off at −30 V or lower, being controlled to be on at 0 V or higher, and to vary continuously between −30 V and 0 V, thus gradation display being practicable.

The electron beams emitted through the modulation means in accordance with the information signals collided against the fluorescent material 56 to display one line of information of the information signal. This operation was sequentially conducted to obtain a display of entire picture. The image displayed by the image-forming apparatus of this Example exhibited low irregularity in luminance, and gave a sharp image with high contrast. The image-forming apparatus having a well-known constitution of a cathode beam tube gave a sharp color image with high contrast with less irregularity of luminance by use of a face plate employing color fluorescent materials of R (red), G (green), and B (blue).

EXAMPLE 20

Figure 23:
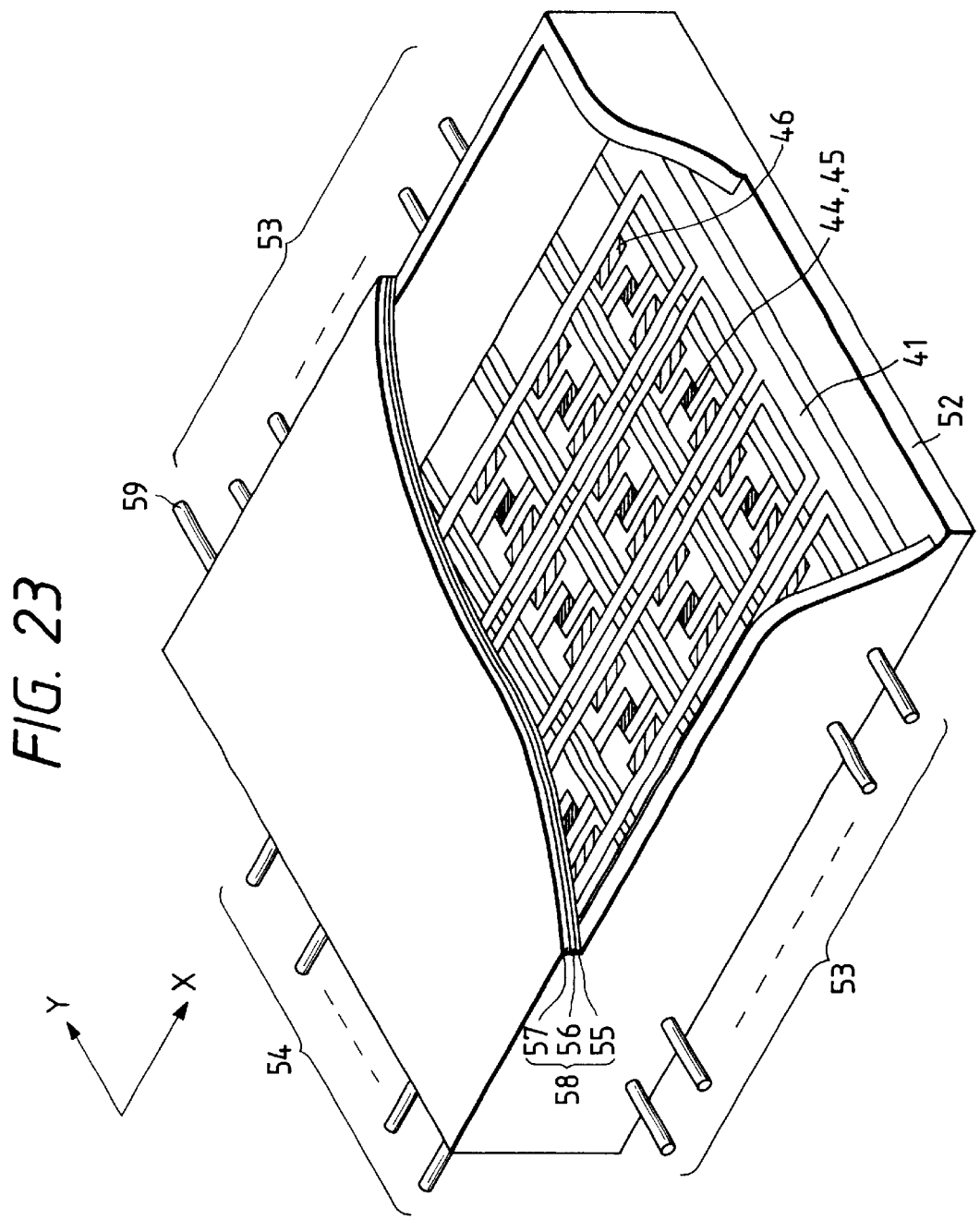
FIG. 23 is a perspective view illustrating schematically another image-forming apparatus of the present invention.

An image-forming apparatus as shown in FIG. 23 was prepared by use of the electron beam-generating apparatus of Example 16. The apparatus was driven to display a luminescent image of the fluorescent material in the same manner as in Example 19, except that the voltage applied to the modulation means was −40 V or lower to control the electron beam to be off and +10 V or higher to control the electron beam to be on. In the voltage range between −40 V to +10 V, the quantity of the electron of the electron beam varies continuously, thereby gradation of display being practicable.

In this Example also, the same effects as in Example 19 were confirmed.

EXAMPLE 21

Figure 24:
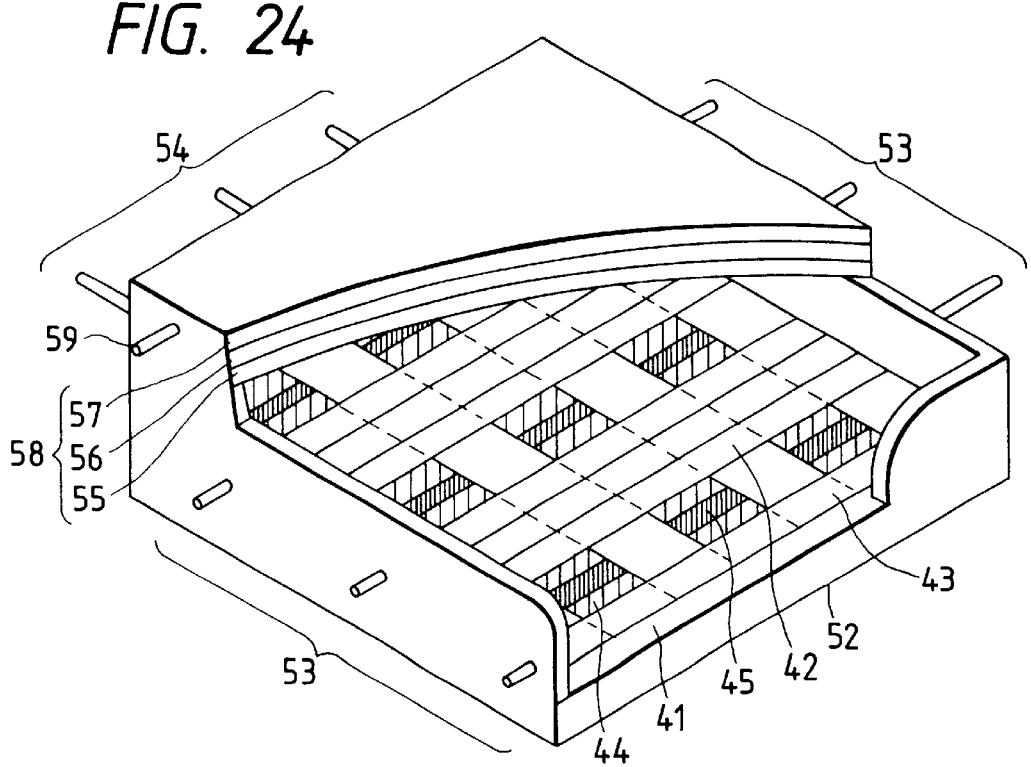
FIG. 24 is a perspective view illustrating schematically still another image-forming apparatus of the present invention.

An image-forming apparatus as shown in FIG. 24 was prepared by use of the electron beam-generating apparatus of Example 17. The apparatus was driven to display a luminescent image of the fluorescent material in the same manner as in Example 19, except that the voltage applied to the modulation means was −40 V or lower to control the electron beam to be off and +10 V or higher to control the electron beam to be on. In the voltage range between −40 V to +10 V, the quantity of the electron of the electron beam varies continuously, thereby gradation of display being practicable.

In this Example also, the same effects as in Example 19 were confirmed.

EXAMPLE 22

Figure 25:
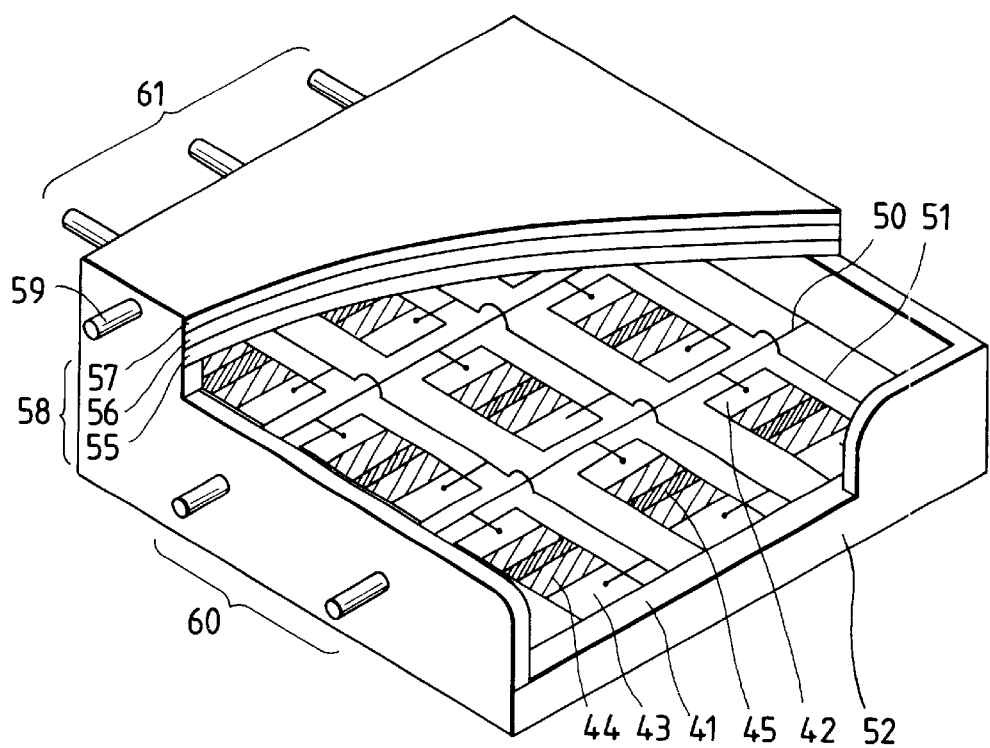
FIG. 25 is a perspective view illustrating schematically still another image-forming apparatus of the present invention.

An image-forming apparatus shown in FIG. 25 which is similar to the one of Example 19 was prepared by use of the electron beam-generating apparatus of Example 18. In FIG. 25, the numerals 51 and 52 respectively denote a wiring connected to the scanning wiring electrode and a wiring connected to the signal wiring electrode.

The image-forming apparatus was driven in a manner shown below. The panel vessel constructed from the face plate 58 and the rear plate 52 was evacuated to a vacuum of $10^{-6}$ torr; the voltage of the fluorescent material face was set through the EV terminal 59 at 5 KV to 10 KV. Electron beams were emitted from the electron-emitting devices on application of the device voltage indicated in Examples 1 to 13 to the electron-emitting devices. First, a pulsing voltage of 0 V or half the device voltage was applied by the scanning wiring electrode 51 to one line of a plurality of the electron-emitting devices. Then another pulsing voltage of 0 V or half the device voltage was applied to the signal wiring electrode 50 in correspondence with information signals to project the electron beam to the fluorescent material 56 in correspondence with the information signals for the one line. Such operation was conducted sequentially for adjacent lines to obtain display of one picture image.

In this Example also, the similar effects as in Example 14 were confirmed.

EXAMPLE 23

An image-forming apparatus shown in FIG. 28 was prepared by providing an atmospheric pressure-supporting member 95 additionally in the image-forming apparatus of Example 22. In this Example, the apparatus was driven in the same manner as in Example 22, and nearly the same results were obtained, Furthermore, the face plate and the rear plate could be made thinner, whereby the weight of the image-forming apparatus could be reduced, and the picture screen could be enlarged.

TABLE 1

| Electron-emitting device | Device voltage V | Device current mA | Emission current μA | Ineffective current % | Voltage application length Å | Electric field strength $10^7$ V/cm |
|---|---|---|---|---|---|---|
| Example 1 (1) | 16 | 2.2 | 2.0 | 2.0 | 50 | 3.2 |
| Example 1 (2) | 18 | 1.5 | 1.2 | 0.8 | 100 | 1.8 |
| Example 1 (3) | 30 | 0.18 | 0.2 | 0.6 | 300 | 1.0 |
| Example 2 (1) | 18 | 1.3 | 1.3 | 0.7 | 100 | 1.8 |
| Example 2 (2) | 18 | 0.8 | 0.8 | 0.7 | 100 | 1.8 |

TABLE 2

| Electron-emitting device | Device voltage V | Device current mA | Emission current μA | Ineffective current % | Voltage application length Å | Electric field strength $10^7$ V/cm |
|---|---|---|---|---|---|---|
| Example 4 (1) | 13 | 3.0 | 1.5 | 1.2 | 30 | 4.3 |
| Example 4 (2) | 14.5 | 2.0 | 1.5 | 0.7 | 40 | 3.6 |
| Example 4 (3) | 16 | 0.1 | 0.2 | 0.3 | 120 | 1.3 |
| Example 7 (1) | 14.5 | 2.0 | 1.6 | 0.7 | 40 | 3.6 |
| Example 7 (2) | 14.5 | 0.8 | 0.6 | 0.7 | 40 | 3.6 |

TABLE 3

| Electron-emitting device | Device voltage V | Device current mA | Emission current μA | Ineffective current % | Voltage application length Å | Electric field strength $10^7$ V/cm |
|---|---|---|---|---|---|---|
| Example 9 (1) | 13.5 | 3.5 | 2.8 | 1.0 | 30 | 4.3 |
| Example 9 (2) | 14 | 2.5 | 2.5 | 0.5 | 40 | 3.6 |
| Example 9 (3) | 16 | 0.3 | 0.5 | 0.3 | 120 | 1.3 |
| Example 13 (1) | 13.5 | 3.5 | 3.0 | 0.9 | 30 | 4.3 |
| Example 13 (2) | 14 | 2.5 | 2.7 | 0.4 | 40 | 3.6 |
| Example 13 (3) | 16 | 0.3 | 0.6 | 0.2 | 120 | 1.3 |

What is claimed is:

1. An image-forming apparatus, comprising:

an electron source;

an image forming member located opposite said electron source, for forming an image when irradiated by an electron beam emitted from said electron source; and at least one atmospheric supporting member located between corresponding portions of said electron source and said image forming member, wherein said electron source comprises a plurality of electron-emitting devices, a plurality of scanning wirings, and a plurality of signal wirings, said plurality of electron-emitting devices being arranged in a matrix on a substrate by said plurality of scanning wirings and said plurality of signal wirings, and each electron-emitting device of said plurality of electron-emitting devices including an ineffective current of 2% or less, and comprising a pair of electroconductive films and a pair of electrodes, wherein the electroconductive films are connected to respective ones of the electrodes by covering portions of those respective electrodes, each of said electron-emitting devices emits electrons from a portion between the electrodes in the pair thereof when applying a voltage across the electrodes in the pair thereof, each of said scanning wirings is arranged along a direction in which the electrodes in the pair oppose each other and is connected to one of the electrodes in the pair of each electron-emitting device, each of said signal wirings is connected to the other of the electrodes in the pair of each electron-emitting device, and a scanning pulse is applied sequentially to the plurality of scanning wirings, and signal pulses are applied to the plurality of signal wirings, so that at least some of the plurality of electron-emitting devices connected to those scanning wirings are driven.

2. An electron beam-generating apparatus comprising:

a plurality of electron-emitting devices arranged in a matrix configuration on a substrate;

a plurality of scanning wirings arranged on the substrate; and a plurality of signal wirings which intersect with said plurality of scanning wirings, wherein each of said electron-emitting devices comprises a first electrode on the substrate and a second electrode on the substrate opposing the first electrode and separated from the first electrode by a gap, and emits electrons from a portion between the first and second electrodes when a voltage is applied across the first and second electrodes, each of said scanning wirings is arranged along a direction in which the first and second electrodes oppose each other and is connected to the first electrodes, each of said signal wirings is connected to the second electrodes, and a scanning pulse is applied sequentially to the plurality of scanning wirings, and signal pulses are applied to the plurality of signal wirings, so that at least some of the plurality of electron-emitting devices connected to those scanning wirings are driven.

3. An image-forming apparatus comprising:

a plurality of electron-emitting devices arranged in a matrix configuration on a substrate;

a plurality of scanning wirings arranged on the substrate;

a plurality of signal wirings arranged on the substrate to intersect with said plurality of scanning wirings; and a plate provided with fluorescent material opposing the substrate and being separated therefrom by a space, wherein each of said electron-emitting devices comprises a first electrode on the substrate and a second electrode on the substrate opposing the first electrode and separated from the first electrode by a gap, and emits electrons from a portion between the first and second electrodes when a voltage is applied across the first and second electrodes, each of said scanning wirings is arranged along a direction in which the first and second electrodes oppose each other and is connected to the first electrodes, each of said signal wirings is connected to the second electrodes, and a scanning pulse is applied sequentially to the plurality of scanning wirings, and signal pulses are applied to the plurality of signal wirings, so that at least some of the plurality of electron-emitting devices connected to those scanning wirings are driven.

4. An image-forming apparatus, comprising:

an electron source;

an image forming member located opposite said electron source, for forming an image when irradiated by an electron beam emitted from said electron source; and at least one atmospheric supporting member located between corresponding portions of said electron source and said image forming member, wherein said electron source comprises a plurality of electron-emitting devices, a plurality of scanning wirings, and a plurality of signal wirings, said plurality of electron-emitting devices arranged in a matrix on a substrate by said plurality of scanning wirings and said plurality of signal wirings, and comprising a pair of electroconductive films and a pair of electrodes, wherein the electroconductive films are connected to respective ones of the electrodes by covering portions of those respective electrodes, each of said electron-emitting devices emits electrons from an electron emission region between the electrodes in the pair thereof when a voltage is applied across the electrodes in the pair thereof, each of said scanning wirings is connected to one of the electrodes in the pair of each electron-emitting device, each of said signal wirings is connected to the other of the electrodes in the pair of each electron-emitting device, the electrode connected to one scanning wiring in one electron-emitting device is positioned between the electron emission region of said one electron-emitting device and the signal wiring connected to an electron-emitting device neighboring said one electron-emitting device which is connected to said one scanning wiring, and a scanning pulse is applied sequentially to the plurality of scanning wirings, and signal pulses are applied to the plurality of signal wirings, so that at least some of the plurality of electron-emitting devices connected to those scanning wirings are driven.

5. The image forming apparatus according to claim 1 or 4, wherein for a height from the surface of the substrate to the surface of the pair of electroconductive films in each of the electron emitting devices, the height at a region on the electrodes in the pair is higher than the height at a region between the electrodes in the pair.

6. The image-forming apparatus according to any one of claims 1, 3 or 4, wherein a voltage in the range of 5 kV to 10 kV is applied to the image forming member.

7. The image-forming apparatus according to claim 1 or 4, wherein the electroconductive films contain Pd particles.

8. An electron beam-generating apparatus comprising:

a plurality of electron-emitting devices arranged in a matrix configuration on a substrate;

a plurality of scanning wirings arranged on the substrate; and a plurality of signal wirings which intersect with said plurality of scanning wirings, wherein each of said electron-emitting devices comprises a first electrode on the substrate and a second electrode on the substrate opposing the first electrode and separated from the first electrode by a gap, and emits electrons from an electron emission region between the first and second electrodes when a voltage is applied across the first and second electrodes, each of said scanning wirings is connected to the first electrodes, each of said signal wirings is connected to the second electrodes, the electrode connected to one scanning wiring in one electron-emitting device is positioned between the electron emission region of said one electron-emitting device and the signal wiring connected to an electron-emitting device neighboring said one electron-emitting device which is connected to said one scanning wiring, and a scanning pulse is applied sequentially to the plurality of scanning wirings, and signal pulses are applied to the plurality of signal wirings, so that at least some of the plurality of electron-emitting devices connected to those scanning wirings are driven.

9. The electron beam-generating apparatus according to claim 2 or 8, wherein each of the electron-emitting devices is formed at an area on the substrate where the scanning wirings an signal wirings are not formed.

10. The electron beam-generating apparatus according to claim 2 or 8, wherein each of the electron-emitting devices further comprises an electroconductive film on the substrate between the first and second electrodes, the ends of the electroconductive film overlying respectively the first and second electrodes, and wherein for a height from the surface of the substrate to the surface of the electroconductive film in each of the electron emitting devices, the height at a region on the first and second electrodes is higher than the height at a region between the first and second electrodes.

11. The electron beam-generating apparatus according to claim 2 or 8, wherein a voltage in the range of 13 V to 30 V is applied between the electrodes in each of the electron-emitting devices to emit electrons.

12. An image-forming apparatus comprising:
a plurality of electron-emitting devices arranged in a matrix configuration on a substrate;
a plurality of scanning wirings arranged on the substrate;
a plurality of signal wirings arranged on the substrate to intersect with said plurality of scanning wirings; and
a plate provided with fluorescent material opposing the substrate and being separated therefrom by a space,
wherein each of said electron-emitting devices comprises a first electrode on the substrate and a second electrode on the substrate opposing the first electrode and separated from the first electrode by a gap, and emits electrons from an electron emission region between the first and second electrodes when a voltage is applied across the first and second electrodes,
each of said scanning wirings is connected to the first electrodes,
each of said signal wirings is connected to the second electrodes,
the electrode connected to one scanning wiring in one electron-emitting device is positioned between the electron emission region of said one electron-emitting device and the signal wiring connected to a neighboring electron-emitting device which is connected to said one scanning wiring, and
a scanning pulse is applied sequentially to the plurality of scanning wirings, and signal pulses are applied to the plurality of signal wirings, so that at least some of the plurality of electron-emitting devices connected to the scanning wirings are driven.

13. The image-forming apparatus according to any one of claims 1, 3, 4, or 12 wherein each of the electron-emitting devices is formed at an area on the substrate where the scanning wirings and signal wirings are not formed.

14. The image-forming apparatus according to claim 3 or 12, wherein each of said electron-emitting devices further comprises an electroconductive film on the substrate between the first and second electrodes, the ends of the electroconductive film overlying respectively the first and second electrodes, and
wherein for a height from the surface of the substrate to the surface of the electroconductive film in each of the electron emitting devices, the height at a region on the first and second electrodes is higher than the height at a region between the first and second electrodes.

15. The image-forming apparatus according to any one of claims 1, 3, 4 or 12, wherein a voltage in the range of 13 V to 30 V is applied between the electrodes in each of the electron-emitting devices to emit electrons.

* * * * *

UNITED STATES PATENT AND TRADEMARK OFFICE
CERTIFICATE OF CORRECTION

PATENT NO. : 6,593,950 B2
DATED : July 15, 2003
INVENTOR(S) : Ichiro Nomura et al.

It is certified that error appears in the above-identified patent and that said Letters Patent is hereby corrected as shown below:

Title page,
Item [*] Notice, insert: -- This patent issued on a continued prosecution application filed under 37 CFR 1.53(d), and is subject to the twenty year patent term provisions of 35 U.S.C. 154(a)(2). --.
Item [56], References Cited, FOREIGN PATENT DOCUMENTS
"EP    0 354 750    2/1990" should be deleted.

Column 1,
Line 56, "electron are emitted" should read -- electrons are emitted --; and
Line 59, "electrode" should read -- electrodes --.

Column 3,
Line 3, "consumes" should read -- consume --.

Column 5,
Line 10, "th e" should read -- the --; and
Line 13, "an other" should read -- another --.

Column 6,
Line 23, "shows" should read -- show --; and
Line 42, "particles In" should read -- particles. ¶ In --.

Column 9,
Line 49, "Examples," should read -- examples, --.

Column 10,
Line 52, "week," should read -- weak, --.

Column 13,
Line 6, "6were" should read -- 6 were --; and
Line 67, "As the" should read -- As a --.

Column 14,
Line 1, "results," should read -- result, --.

Column 15,
Line 51, "7×103" should read -- $7 \times 10^3$ --.

Column 17,
Line 66, "apparatuses were" should read -- apparatus was --.

UNITED STATES PATENT AND TRADEMARK OFFICE
CERTIFICATE OF CORRECTION

PATENT NO. : 6,593,950 B2
DATED : July 15, 2003
INVENTOR(S) : Ichiro Nomura et al.

It is certified that error appears in the above-identified patent and that said Letters Patent is hereby corrected as shown below:

Column 24,
Line 59, "an" should read -- and --; and
Line 62, close up right margin.

Column 26,
Line 10, "12" should read -- 12, --.

Signed and Sealed this

Eleventh Day of May, 2004

JON W. DUDAS
*Acting Director of the United States Patent and Trademark Office*